United States Patent
Aoyama

(10) Patent No.: US 9,404,999 B2
(45) Date of Patent: Aug. 2, 2016

(54) LOCALIZATION SYSTEM AND LOCALIZATION METHOD

(75) Inventor: Chiaki Aoyama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 776 days.

(21) Appl. No.: 12/620,189

(22) Filed: Nov. 17, 2009

(65) Prior Publication Data

US 2010/0123905 A1   May 20, 2010

(30) Foreign Application Priority Data

Nov. 17, 2008   (JP) ................... 2008-293726

(51) Int. Cl.
*G01S 5/16* (2006.01)
*G01S 3/784* (2006.01)
*G01S 5/00* (2006.01)

(52) U.S. Cl.
CPC . *G01S 5/16* (2013.01); *G01S 3/784* (2013.01); *G01S 5/009* (2013.01)

(58) Field of Classification Search
CPC ............ G01S 3/784; G01S 5/16; G01S 5/009
USPC .................... 356/3.1, 3.12–3.14, 622, 623, 356/139.1–139.6
See application file for complete search history.

(56) References Cited

U.S. PATENT DOCUMENTS

| 7,821,649 B2 * | 10/2010 | Bendall et al. ............. 356/606 |
| 7,897,928 B2 * | 3/2011 | Kaufmann et al. ...... 250/370.08 |
| 2006/0249657 A1 * | 11/2006 | O'Grady ................ 250/214 R |
| 2007/0084927 A1 * | 4/2007 | Itou et al. ................. 235/454 |
| 2007/0195162 A1 | 8/2007 | Graff et al. |
| 2010/0228421 A1 * | 9/2010 | DiBernardo et al. ......... 701/28 |

FOREIGN PATENT DOCUMENTS

| JP | 2000-131018 | | 5/2000 | |
| JP | 2005-077172 A | | 3/2005 | |
| JP | 2005077172 | * | 3/2005 | ............ G01S 5/14 |
| JP | 2006-339879 | | 12/2006 | |
| JP | 2008-151789 | | 7/2008 | |

OTHER PUBLICATIONS

Takuji Tokiwa, Development of Optical-resolver for Ubiquitous Environment, IEICE Technical Report, Japan, The Institute of Electronics, Information and Communication Engineers, May 26, 2008, vol. 108, No. 77(MVE2000-18), pp. 97 to 102.

* cited by examiner

*Primary Examiner* — Rebecca C Bryant
(74) *Attorney, Agent, or Firm* — Squire Patton Boggs (US) LLP

(57) ABSTRACT

A localization system includes: n+1 number of luminescent devices, where n is an integer greater than or equal to one; and a position measurement device moving in each direction of n number of axes, wherein the luminescent device includes a luminescent unit, the luminescent unit emitting a light for measurement having an intensity that varies at a predetermined time cycle, the luminescent unit also emitting a light for identification including an information representing a position of the luminescent device, the luminescent unit emitting the light for measurement and the light for identification in synchrony with a phase of those emitted by another luminescent device; and the position measurement device includes a light reception unit, a position obtaining unit, a phase computation unit, a standard luminescent device selection unit, a phase difference computation unit, and a position computation unit.

8 Claims, 21 Drawing Sheets

| IDENTIFYING INFORMATION | x | y | z |
|---|---|---|---|
| 110011 | X1 | Y1 | Z1 |
| 101010 | X2 | Y2 | Z2 |
| 100100 | X3 | Y3 | Z3 |
| ⋮ | ⋮ | ⋮ | ⋮ |

LOCALIZATION SYSTEM AND LOCALIZATION METHOD

The present application claims priority on Japanese Patent Application No. 2008-293726, filed Nov. 17, 2008, the content of which is incorporated herein by reference.

BACKGROUND OF THE INVENTION

1. Field of the Invention

The present invention relates to a localization system (hereinafter may be referred to as a position measurement system) and a localization method (hereinafter may be referred to as a position measurement method) enabling localization even in a space in which signals from a GPS (Global Positioning System) satellite cannot be received.

2. Description of the Related Art

Conventionally, GPS has been used as a technology for localization in an outdoor setting. For example, GPS has been used in car navigation systems. In addition, in recent years, cellular telephones and notebook computers have been equipped with a GPS terminal, as the size of the GPS terminal has been made smaller.

According to the GPS system, a plurality of GPS satellites (space satellites) transmit a microwave signal holding time data. The GPS terminal receives this microwave signal. Based on this microwave signal, the GPS terminal obtains the present location of the own device. Therefore, at a place in which microwaves transmitted from the GPS satellites cannot be received, the GPS terminal cannot measure the present position of the own device.

In response to these types of problems, a system is suggested, in which a microwave signal transmitted from a GPS satellite is artificially created at a transmitter station on the ground (for example, in a room interior) as a light signal. Thus, according to this suggested system, positions can be measured even in a place in which microwaves transmitted from the GPS satellite cannot be received (refer to Japanese Unexamined Patent Application No. 2005-77172 ("Patent Document 1")).

However, according to the technology disclosed in Patent Document 1, it is difficult to improve the accuracy of the measurement, when the measurement precision was inadequate. Considering such problems, an object of the present invention is to provide a localization system and a localization method that enables a measurement of a position in a space in which signals from the GPS satellite cannot be received, and further improves the accuracy of the measurement.

SUMMARY OF THE INVENTION

In order to achieve the above object, the present invention employs the following.

A localization system according to an aspect of the present invention includes: n+1 number of luminescent devices, where n is an integer greater than or equal to one; and a position measurement device moving in each direction of n number of axes, wherein the luminescent device includes a luminescent unit, the luminescent unit emitting a light for measurement having an intensity that varies at a predetermined time cycle, the luminescent unit also emitting a light for identification including an information representing a position of the luminescent device, the luminescent unit emitting the light for measurement and the light for identification in synchrony with a phase of those emitted by another luminescent device; and the position measurement device includes a light reception unit receiving the light for measurement and the light for identification by a plurality of light reception elements, a position obtaining unit obtaining a position of the luminescent device based on the light for identification received by the light reception unit, a phase computation unit computing a phase of the light for measurement received by the light reception unit, a standard luminescent device selection unit selecting one of the luminescent devices as a standard luminescent device based on the light for measurement emitted by each of the luminescent devices and received by the light reception unit, a phase difference computation unit computing a phase difference between the light for measurement emitted by the standard luminescent device and the light for measurement emitted by the another luminescent device, the phase difference computation unit computing the phase difference for each luminescent device, and a position computation unit computing the position of the position measurement device based on the position of each of the luminescent devices and the phase difference computed for each of the luminescent devices.

In addition, the localization system according to the above embodiment may be configured as follows: the luminescent unit of the luminescent device emits a plurality of light for measurement having an intensity that changes in each of a different predetermined time cycle; and the position computation unit of the position measurement device computes the position of the position measurement device using a particular light for measurement of a time cycle and obtains an estimated distance between the position measurement device and the luminescent device, then computes the position of the position measurement device again according to the estimated distance and a phase of another light for measurement having a shorter time cycle compared to the particular light for measurement that was already used.

In addition, the localization system according to the above embodiment may be configured as follows: the position measurement device includes an estimated distance computation unit computing an estimated distance between the position measurement device and each of the luminescent devices according to the position of the position measurement device already computed by the position computation unit, a wave number/phase computation unit computing a wave number of the wave existing between the position measurement device and each of the luminescent devices based on the estimated distance according to the light for measurement having the shorter time cycle compared to the particular light for measurement that was already used by the position computation unit to compute the position of the position measurement device, the wave number/phase computation unit also computing a phase of the light for measurement having the shorter time cycle emitted by the standard luminescent device, the wave number/phase computation unit further setting the phase of the wave existing between the position measurement device and the standard luminescent device as a standard phase according to the estimated distance, a standard difference computation unit computing a difference between the standard phase and the phase of the light for measurement having the shorter time cycle computed by the wave number/phase computation unit, and a standard difference addition unit computing an added phase by adding the difference to the phase of the light for measurement having the shorter time cycle emitted by the luminescent device, wherein the position computation unit computes the position of the position measurement device based on the light for measurement having the shorter time cycle by processing the added phase computed by the standard difference addition unit as the phase of the light for measurement emitted by the luminescent device.

In addition, the localization system according to the above embodiment may be configured as follows: a ratio of the predetermined time cycle of the plurality of light for measurement is an integral ratio.

In addition, the localization system according to the above embodiment may be configured as follows: the position measurement device further includes a clustering unit selecting, from among the plurality of light reception elements of the light reception unit, a light reception result by a selected light reception element having a light reception intensity exceeding a predetermined threshold, the clustering unit grouping the selected light reception element.

In addition, the localization system according to the above embodiment may be configured as follows: the light reception unit includes a lens, and the light reception element placed at a location different from a focal point of the lens.

In addition, the localization system according to the above embodiment may be configured as follows: the light reception unit includes an optical low pass filter, the light reception element receiving a light passing through the optical low pass filter.

In addition, the localization system according to the above embodiment may be configured as follows: the lens is a fisheye lens.

Furthermore, a localization method of the above localization system according to an aspect of the present invention includes: a light emission step in which the luminescent device emits a light for measurement having an intensity that varies at a predetermined time cycle, the luminescent device also emitting a light for identification including an information representing a position of the luminescent device, the luminescent device emitting the light for measurement and the light for identification in synchrony with a phase of those emitted by another luminescent device; a light reception step in which the position measurement device receives the light for measurement and the light for identification by a plurality of light reception elements; a position obtaining step in which the position measurement device obtains a position of each luminescent device based on the light for identification received by the light reception unit; a phase computation step in which the position measurement device computes a phase of the light for measurement received by the light reception unit; a standard luminescent device selection step in which the position measurement device selects one of the luminescent devices as a standard luminescent device based on the light for measurement emitted by each of the luminescent devices and received by the light reception unit; a phase difference computation step in which the position measurement device computes a phase difference between the light for measurement emitted by the standard luminescent device and the light for measurement emitted by the another luminescent device, the position measurement device computing the phase difference for each luminescent device; and a position computation step in which the position measurement device computes the position of the position measurement device based on the position of each of the luminescent devices and the phase difference computed for each of the luminescent devices.

According to the localization system and the localization method based on the present invention, the position measurement device measures the position of the own device by receiving a light transmitted by the luminescent device. At this time, the position measurement device measures the position based on the phase of the waveform represented by the change in the intensity of the light that was received. As a result, it is not necessary to form an image of the received light on the light-receiving element. Therefore, the position measurement device need not adjust the focus of the light received by the luminescent device. Even when the light received by the luminescent device is not in focus, the position can be measured accurately.

In addition, according to the embodiment in which the luminescent unit emits a plurality of light for measurement, the light changes its intensity in each of the different time cycles. Here, the position measurement device computes an estimated distance based on the position of the own device calculated by using the light for measurement that has a long cycle. In this embodiment, the position measurement device conducts an operation using the value of the estimated distance and the light for measurement having a short cycle. Therefore, the position can be calculated with even more precision compared to the case in which the position of the own device is computed using a light for measurement having a long cycle.

Furthermore, according to the embodiment in which the time period of the plurality of light for measurement is set so that each of the ratios of the time periods are expressed in integers, when the light receiving element receives a light for measurement having a specific time period, the noise, received by the light receiving element from another light for measurement having another time period, can be reduced.

In addition, according to the embodiment in which the position measurement device further includes a clustering unit, only the light reception by the light receiving element with an intensity level exceeding a predetermined threshold value will be selected. Therefore, it is possible to calculate the position with more accuracy.

According to the embodiment in which the light receiving device is provided at a place different from the focal point of the lens, a greater number of light receiving elements can receive the light for measurement and the light for identification through the lens. As a result, it is possible to prevent an instance in which the position cannot be measured.

Furthermore, according to an embodiment in which an optical low-pass filter is provided, a greater number of light receiving elements can receive the light for measurement and the light for identification through the lens. As a result, it is possible to prevent an instance in which position cannot be measured.

In addition, according to an embodiment in which the lens is configured to be a fisheye lens, it is possible to receive the light for measurement and the light for identification emitted by the luminescent device placed in a wider range of locations. As a result, it is possible to prevent an instance in which the measurement of the position becomes impossible.

DETAILED DESCRIPTION OF THE PREFERRED EMBODIMENTS

First Embodiment

First, a configuration of the localization system is described.

Figure 1:
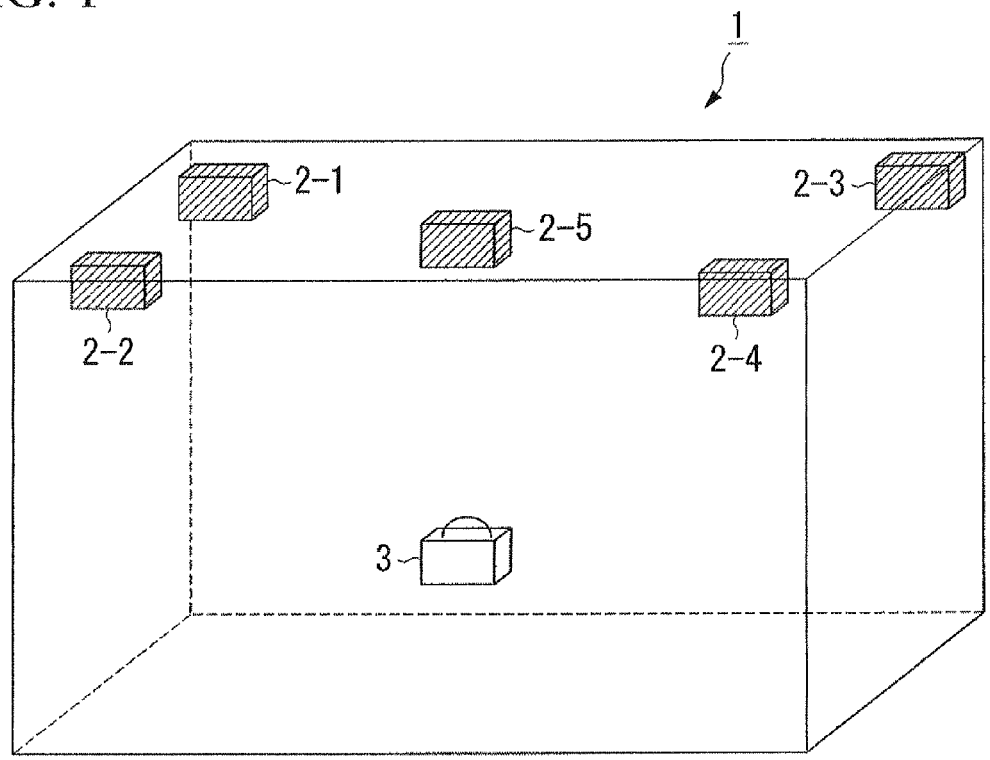
FIG. 1 is a system configuration diagram representing a system configuration of a localization system according to an embodiment of the present invention.

FIG. 1 is a system configuration diagram representing a system configuration of the position measurement system 1. The position measurement system 1 includes five luminescent devices 2-1 to 2-5 and a position measurement device 3. Hereinafter, features that are in common with the luminescent devices 2-1 to 2-5 will be described by simply referring to "the luminescent device 2." The luminescent device 2 is fixed on a ceiling of an interior of a room in which the position measurement system 1 is placed. The luminescent device 2 is fixed on the ceiling so that the luminescent side of the luminescent device 2 faces the floor of the room. The position measurement device 3 receives light from a plurality of luminescent devices 2. The position measurement device 3 measures the position of the own device based on the light that was received.

Figure 2:
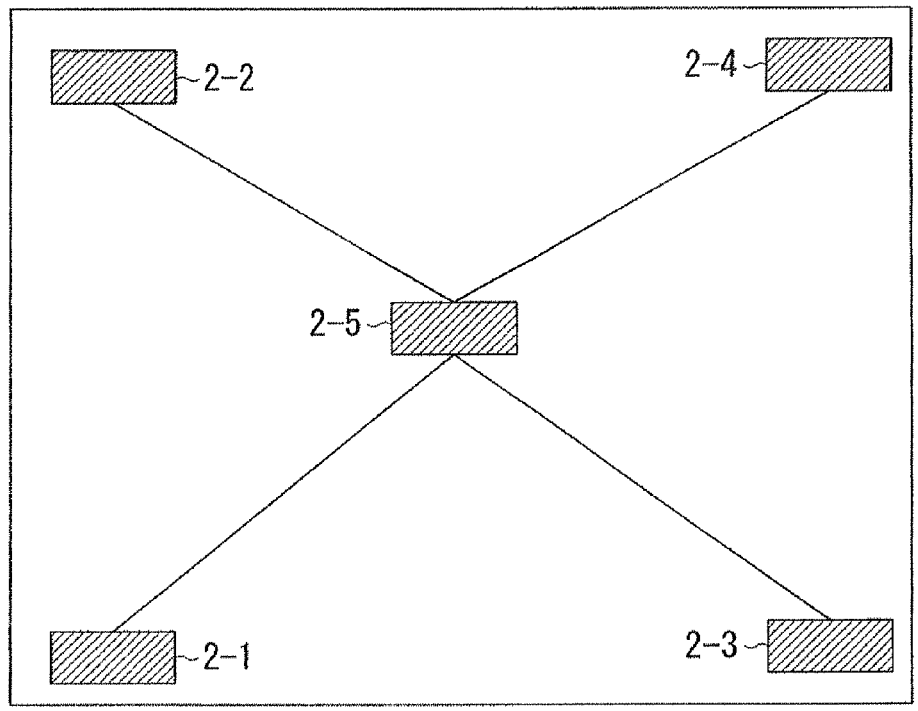
FIG. 2 is a diagram representing an example of an arrangement of a luminescence device of a localization system according to an embodiment of the present invention.

FIG. 2 is a diagram representing an example of an arrangement of the luminescent device 2 of the position measurement system 1. According to the example of the arrangement shown in FIG. 2, five luminescent devices 2-1 to 2-5 are viewed by looking up from the floor side. These luminescent devices are arranged on the ceiling as shown in FIG. 1. In particular, the luminescent devices 2-1 to 2-4 are arranged in each corner of the ceiling of the room. The luminescent device 2-5 is arranged near the center of the ceiling of the room. In addition, the luminescent devices 2-1 to 2-5 are connected via a wire or through a wireless connection, so that communication can be made. The luminescent devices 2-1 to 2-5 emit light in synchrony by a synchronous adjustment unit as described later. In FIG. 2, each of the luminescent devices 2-1 to 2-4 are connected to the luminescent device 2-5 through a wire.

According to the position measurement system 1, the position measurement device 3 moves in each direction of the axes of a three-dimensional system. As a result, four or more luminescent devices 2 need to be provided. Thus, the number of luminescent devices 2 is not limited to five, as shown in FIGS. 1 and 2. When the position measurement device 3 moves in a direction of an axis in a one-dimensional system, two or more luminescent devices 2 need to be provided. When the position measurement device 3 moves in each direction of the axes of a two-dimensional system, three or more luminescent devices 2 need to be provided. Furthermore, considering the location in which the luminescent device 2 is arranged, the luminescent device 2 can be arranged in any place as long as the position measurement device 3 can receive the light emitted by the luminescent device 2. Thus, the luminescent device 2 need not be placed on the ceiling. Moreover, the arrangement of the luminescent device 2 is not limited by the example shown in FIG. 2.

Figure 3:
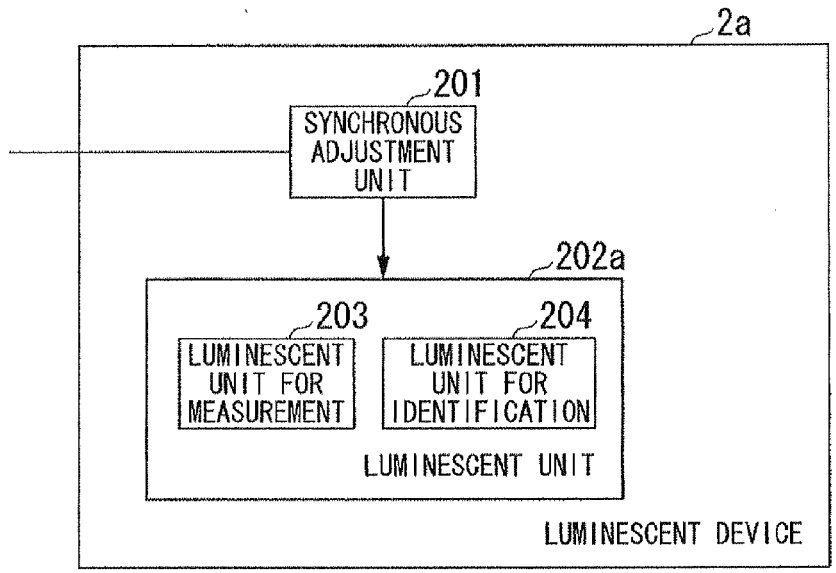
FIG. 3 is a skeletal block diagram representing a functional configuration of a luminescence device. The luminescence device is a first embodiment of a luminescence device of a localization system according to an aspect of the present invention.

Next, a first embodiment of the position measurement system 1 and the position measurement device 3 according to an aspect of the present invention is described. FIG. 3 is a skeletal block diagram representing a functional configuration of the luminescent device 2a. The luminescent device 2a is a first embodiment of the luminescent device 2 of the position measurement system 1 according to an aspect of the present invention. The luminescent device 2a includes a synchronous adjustment unit 201 and a luminescent unit 202a. The luminescent unit 202a includes a luminescent unit for measurement 203 and a luminescent unit for identification 204.

The synchronous adjustment unit 201 outputs a synchronous signal to the luminescent unit 202a by synchronizing with another luminescent device 2a arranged in the position measurement system 1. For example, the synchronous adjustment unit 201 performs the synchronization by transmitting and receiving a synchronous adjustment signal with another luminescent device 2a.

The luminescent unit for measurement 203 is configured with a luminescent device such as LED (Light Emitting Diode). The luminescent unit for measurement 203 emits a light for measurement at a predetermined cycle, at a timing according to the synchronous signal. Here, the light for measurement varies in intensity. Therefore, the phase of the wave represented by the change in the intensity of the light for measurement of each of the luminescent device 2a matches at the time the light is emitted.

Figure 4:
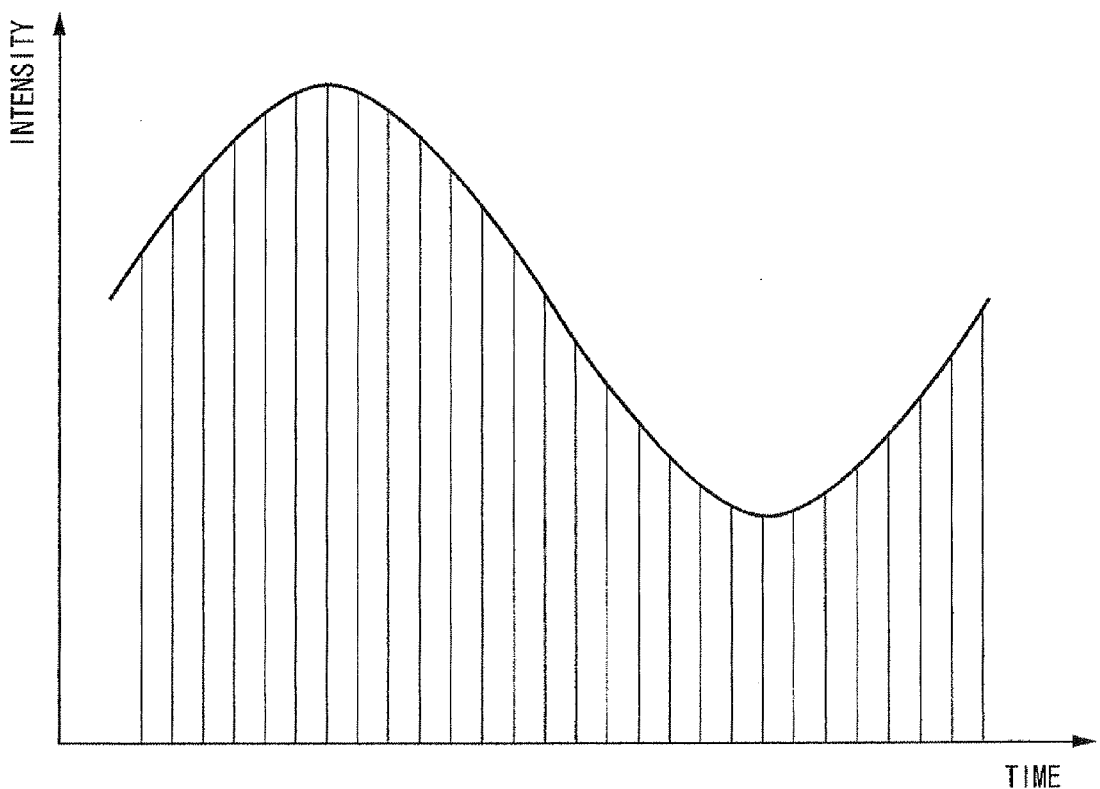
FIG. 4 is a diagram representing an example of a light for measurement.

FIG. 4 is a diagram showing a concrete example of a light for measurement. In FIG. 4, the vertical axis represents the intensity of light, while the horizontal axis represents time. As indicated in FIG. 4, the intensity of the light for measurement changes with time. The waveform created by the temporal variation of the intensity is in the form of a sine-wave. At this time, the cycle of the sine-wave is predetermined, and is common to each of the luminescent devices 2a. The luminescent unit for measurement 203 emits light. The intensity of this light varies with time as shown in FIG. 4.

Hereinafter, the phase of the light for measurement refers to the phase of the sine-wave created by the temporal change in the intensity of the light for measurement. The frequency and the wavelength of the light for measurement each refer to the frequency and the wavelength of this sine-wave. The wavelength of the light for measurement is set to be longer than twice the maximum distance from each of the luminescent devices 2a to the farthest point within the space in which the position measurement system 1 is placed. More preferably, the wavelength of the light for measurement is set to be approximately four times the above maximum distance. By setting the wavelength of the light for measurement in this way, the phase of the light for measurement is distributed within a predetermined range, instead of being distributed from zero degrees to 360 degrees. As a result, it is possible to detect the light for measurement having the most lagging phase from a relative view. For example, when the wavelength of the light for measurement is set to be four times longer than the above maximum distance, it is possible to obtain the phase of the light for measurement as a value between zero degrees and ninety degrees. Thus, based on the magnitude of the obtained value, it is possible to determine whether the phase is relatively leading or lagging.

The luminescent unit for identification 204 is configured using luminescent devices such as an LED. The luminescent unit for identification 204 emits a light for identification carrying an identifying information which is assigned in advance to prevent overlapping among each of the luminescent devices 2a. Identifying information refers to information used to uniquely identify each of the luminescent devices 2a.

Figure 5:
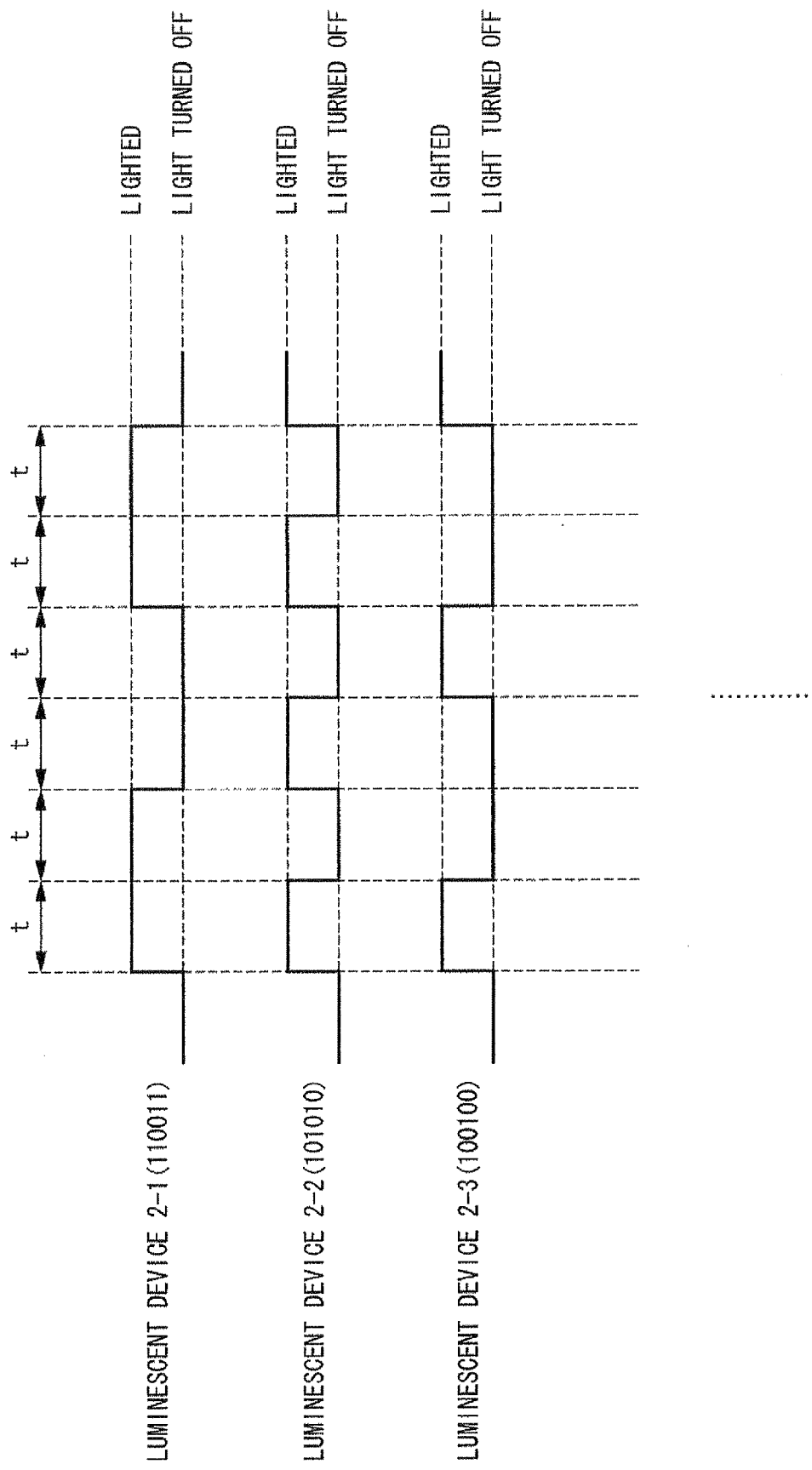
FIG. 5 is a diagram representing an example of a light for identification.

FIG. 5 is a diagram representing a concrete example of a light for identification. The luminescent unit for identification 204 represents a value of two bits by repeatedly turning on and off the light for identification at a predetermined time interval, for example. Thus, the luminescent unit for identification 204 represents the identifying information in two-bit values. In the case of FIG. 5, the identifying information of the luminescent device 2-1 is "110011," the identifying information of the luminescent device 2-2 is "101010," and the identifying information of the luminescent device 2-3 is "100100." Similarly, identifying information is assigned to other luminescent devices 2a, making sure that the identifying information does not overlap.

In this case, the luminescent unit for identification 204 of the luminescent device 2-1 expresses the identifying information "110011" by repeating the light-on (1), light-on (1), light-off (0), light-off (0), light-on (1), and light-on (1) pattern at a predetermined time interval t. The predetermined time interval t is set in advance so that the time interval t is in common with the luminescent unit 204 of other luminescent devices 2a. Other than turning the light on and off, the light for identification can be configured to express identifying information in other ways such as changing the phase, changing the intensity of light, and changing the frequency or wavelength, as long as a change in a characteristic of light is used to express identifying information. In other words, the light for identification can be configured to express identifying information in other ways, as long as it is possible to retrieve the identifying information without forming an image of the light for identification on the light receiving element of the position measurement device 3.

Figure 6:
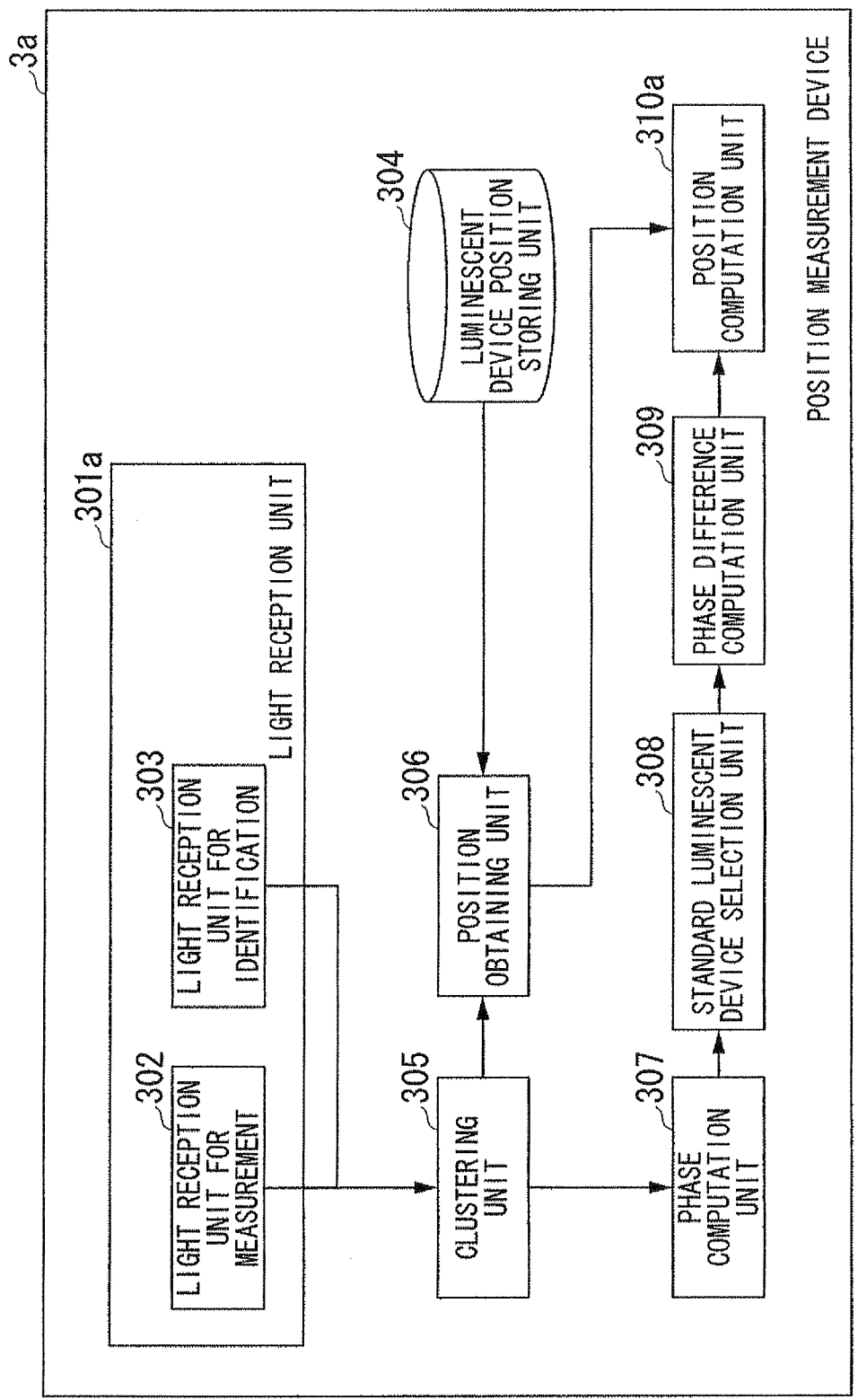
FIG. 6 is a skeletal block diagram representing a functional configuration of a localization device. The localization device is a first embodiment of a localization device of a localization system according to an embodiment of the present invention.

FIG. 6 is a skeletal block diagram representing the functional configuration of the position measurement device 3a. The position measurement device 3a is a first embodiment of the position measurement device 3 of the position measurement system 1. The position measurement device 3a includes a light reception unit 301a, a luminescent device position storing unit 304, a clustering unit 305, a position obtaining unit 306, a phase computation unit 307, a standard luminescent device selection unit 308, a phase difference computation unit 309, and a position computation unit 310a.

Figure 7A:
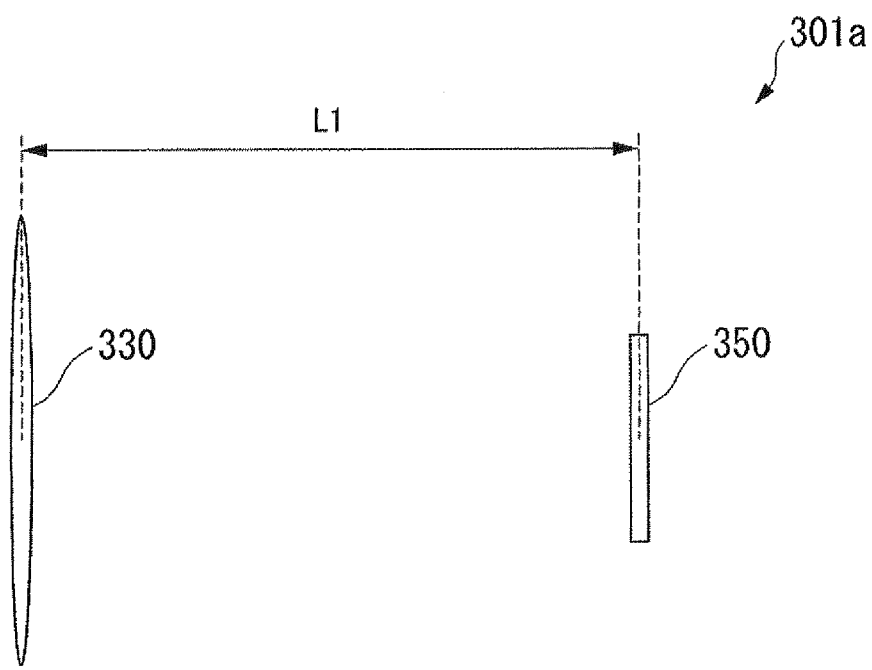
FIG. 7A is a diagram representing an example of a configuration of a light reception unit according to an embodiment of the present invention.
Figure 7B:
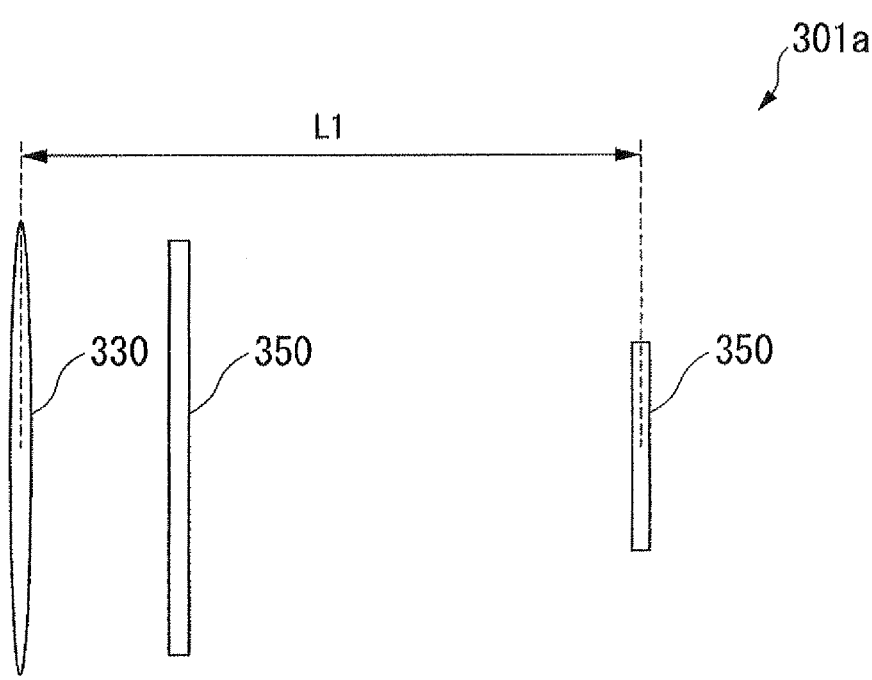
FIG. 7B is a diagram representing an example of a configuration of a light reception unit according to an embodiment of the present invention.

FIGS. 7A and 7B are diagrams representing examples of a configuration of the light reception unit 301a. According to FIG. 7A, the light reception unit 301a includes a lens 330, a light reception unit 302 for measurement which receives a light collected through the lens 330, a light reception unit 303 for identification which also receives a light collected through the lens 330, and a light reception platform 350 on which the light reception unit for measurement 302 and the light reception unit for identification 303 are placed. Since the light reception unit for measurement 302 and the light reception unit for identification 303 are placed on the light reception platform 350, as shown in FIG. 7A, the light reception unit for measurement 302 and the light reception unit for identification 303 are not diagramed.

It is preferable that the lens 330 be a lens that has a large field angle. Lens 330 is configured, for example, using a fisheye lens. According to FIG. 7A, the distance L1 between the lens 330 and the light reception platform 350 is set to differ from the focal point distance of lens 330. Therefore, in the case of FIG. 7A, the light passing through the lens 330 does not form an image that is in focus on the light receiving element of the light reception platform 350. As a result, an image of the light passing through 330 is received out of focus.

According to FIG. 7B, the light reception unit 301a includes a lens 330, an optical low-pass filter 370, a light reception unit for measurement 302 and a light reception unit for identification 303 which receives light that passed through the lens 330 and the optical low-pass filter 370 and was collected, and a light reception platform 350 on which the light reception unit for measurement 302 and the light reception unit for identification 303 are arranged. As in. FIG. 7A, the light reception unit for measurement 302 and the light reception unit for identification 303 are arranged on the light reception platform 350 shown in FIG. 7B. Therefore, the light reception unit for measurement 302 and the light reception unit for identification 303 are not diagramed.

As in the case of FIG. 7A, it is preferable that the lens 330 in FIG. 7B be a lens having a large field angle. For example, the lens 330 is configured using a fisheye lens. Furthermore, according to FIG. 7B, the light that passed through the lens 330 reaches the light reception platform 350 after the high-frequency component is diminished by the optical low-pass filter 370. As a result, in the case of FIG. 7B, the image of the light that passed through the lens 330 is formed on the light reception element of the light reception platform 350. Here, the image of the light is out of focus. The light reception unit 301a can be configured as shown in FIG. 7A or FIG. 7B. The light reception unit 301a can also be configured by another configuration so that an image of the light that passed through the lens 330 is formed on the light reception element. Here, the image is also out of focus. However, it is not necessary that the light reception unit 301a be configured so that the light receiving element receives an image of the light that passed through the lens 330 that is out of focus.

The light reception unit for measurement 302 receives each of the light for measurement emitted by each of the luminescent devices 2a. The light reception unit for measurement 302 then converts the light for measurement to an electronic signal.

The light reception unit for identification 303 receives each of the light for identification emitted by each of the luminescent devices 2a. The light reception unit for identification 303 then converts the light for identification to an electronic signal.

Figures 8A, 8B:
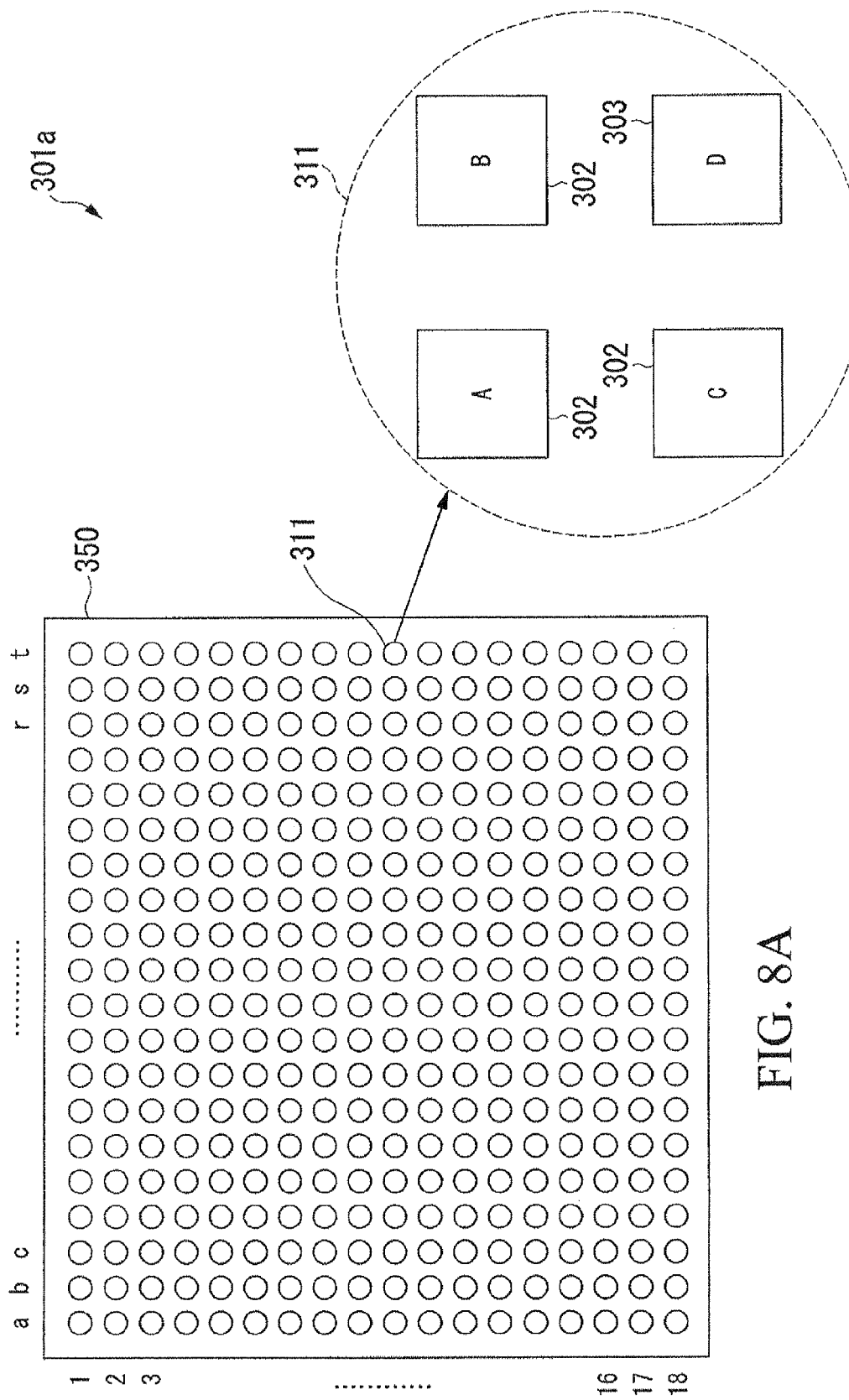
FIG. 8 is a diagram representing a concrete example of a configuration of a light reception unit according to an embodiment of the present invention.

FIGS. 8A and 8B are diagrams representing a concrete example of a configuration of the light reception unit 301a. FIG. 8A is a diagram representing the overall configuration of the light reception unit 301a. The light reception unit 301a is configured so that multiple clusters of light reception units 311 are placed in a two dimensional space. An identifying information is assigned to each of the clusters of light reception units 311 in order to distinguish one cluster of light reception unit 311 from another. In case of FIG. 8A, the cluster of light reception units 311 are placed in the form of a two-dimensional matrix. Numbers 1 to 18 are assigned to each row. Alphabets "a" to "t" are assigned to each column. The combination of a number and an alphabet (for example, "11b") is an identifying information of each of the cluster of light reception units 311.

FIG. 8B is a diagram representing a concrete example of one cluster of light reception units 311. In the case of FIG. 8B, the cluster of light reception units 311 includes three light reception units for measurement 302 (A through C) and one light reception unit for identification 303 (D). A light for measurement received by a light reception unit for measurement 302 is processed in accordance with identifying information expressed by a light for identification received by a light reception unit for identification 303 that is included in the same cluster of light reception units 311.

Figures 9, 10:
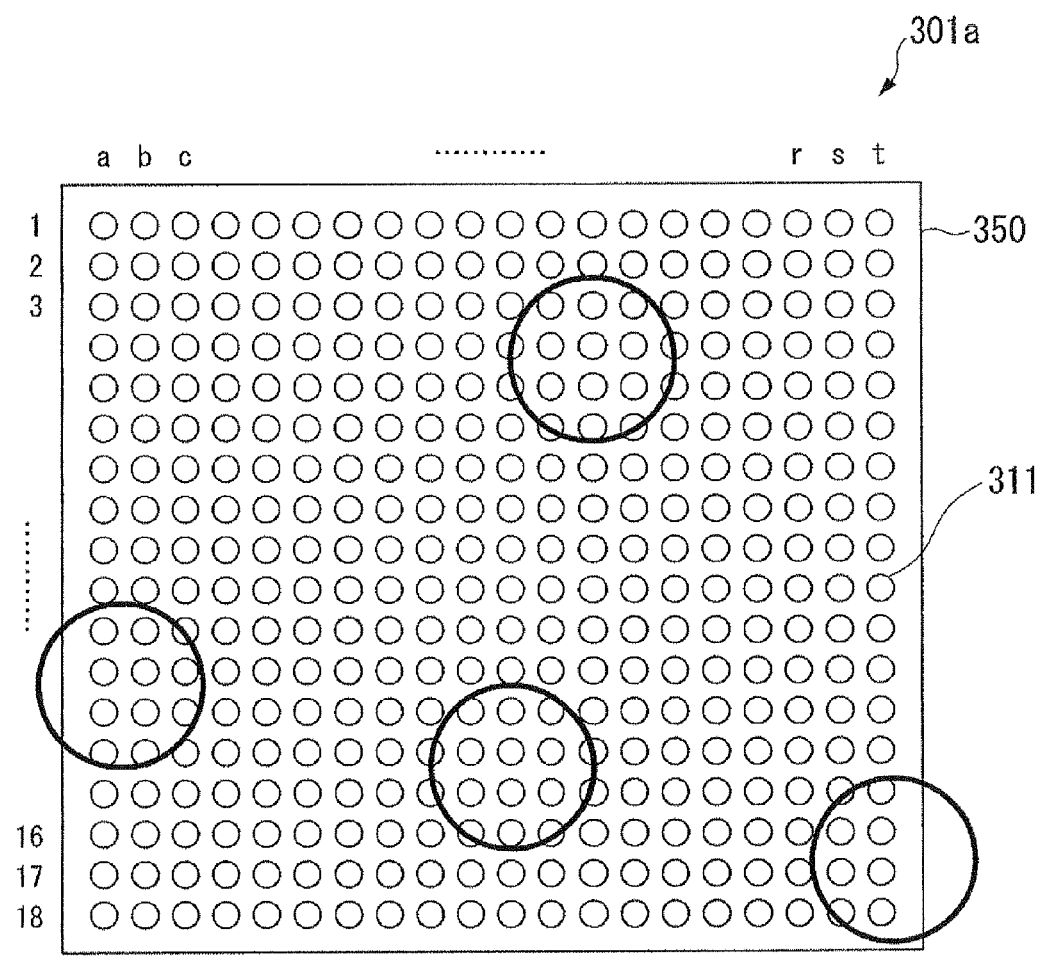
FIG. 9 is a diagram representing a concrete example of a luminescent device position table stored by the luminescent device position storing unit according to an embodiment of the present invention.
FIG. 10 is a diagram representing an example of a result of a clustering according to an embodiment of the present invention.

Next, additional explanation on the position measurement device 3a is provided with reference to FIG. 6. The luminescent device position storing unit 304 stores a table of the position of the luminescent device. The table includes the position (in space coordinates) of each of the luminescent devices 2a. FIG. 9 represents a concrete example of the table of the position of the luminescent device, which is stored by the luminescent device position storing unit 304. The table of the position of the luminescent device includes the values of the x, y, and z coordinates of the spatial position of each of the luminescent devices 2a. The values of the x, y, and z coordinates are listed in the table corresponding to the identifying information that was assigned to each of the luminescent devices 2a. For example, as shown in FIG. 9, the position of luminescent device 2-1 that has "110011" as its identifying information is (X1, Y1, Z1).

Next, the position measurement device 3a is further explained with reference to FIG. 6. The clustering unit 305 groups together each of the cluster of light reception units 311 of the light reception unit 301a based on the light reception intensity. The grouping by the clustering unit 305 can be performed in any way using known, conventional technology.

FIG. 10 is a diagram representing an example of the result of the grouping performed by the clustering unit 305. In FIG. 10, light that was emitted by each of the four luminescent devices 2a are received by the light reception unit 301a. The four bolded circles shown in FIG. 10 represent a collection of the cluster of light reception units 311 that has a light reception intensity that is higher than the threshold value. In this way, the clustering unit 305 selects, for example, the cluster of light reception units 311 that has a light reception intensity that is higher. Then, the clustering unit 305 distributes the clusters of light reception elements 311 that are adjacent to each other based on the spatial position of each cluster of light reception elements 311 to the same group. The clustering unit 305 distributes the cluster of light reception elements 311 that is located at a distance to a different group. In this way, the clustering unit 305 groups the cluster of light reception units 311 of the light reception unit 301a into a plurality of groups. In addition, the clustering unit 305 selects the representative cluster of the light reception units from each group. Then, the clustering unit 305 matches the electric charge of the light for measurement received by the light reception unit for measurement 302 included in the representative cluster of the light reception units, with the identifying information of the representative cluster of the light reception units. The clustering unit 305 then outputs data on the electric charge associated with the identifying information of the representative cluster to the position computation unit 307. In addition, the clustering unit 305 matches an identifying information extracted by the light reception unit for identification 303 of the representative cluster of the light reception units with an identifying information of the representative cluster of the light reception unit. The clustering unit 305 then outputs these pieces of information, which correspond to one another, to the position obtaining unit 306. Regarding the way in which the clustering unit 305 selects the representative cluster of light reception units 311, the cluster unit 305 may, for example, select the cluster of light reception units 311 that is located at the center of each group. As another example, the clustering unit 305 may select the cluster of light reception units 311 that has the highest light reception intensity in each group. The clustering unit 305 may also select the representative cluster using a different method as well.

The position obtaining unit 306 extracts identifying information from the light for identification that was received by the light reception unit for identification 303 of the representative cluster of light reception units of each group. The position obtaining unit 306 then retrieves the spatial coordinate representing the position of the luminescent device 2a corresponding to the extracted identifying information. The position obtaining unit 306 retrieves this spatial coordinate from the luminescent device position storing unit 304. The position obtaining unit 306 matches the retrieved spatial coordinates with the identifying information of the representative cluster of light reception units. The position obtaining unit 306 then outputs the spatial coordinates to the position computation unit 310a.

The phase computation unit 307 computes the phase of the light for measurement received by the light reception unit for measurement 302 of the representative cluster of light reception units of each group. The phase computation unit 307 can compute the phase of the light for measurement using any kind of method. Hereinafter, a description of a concrete example in which the phase computation unit 307 computes the phase is provided.

Figure 11:
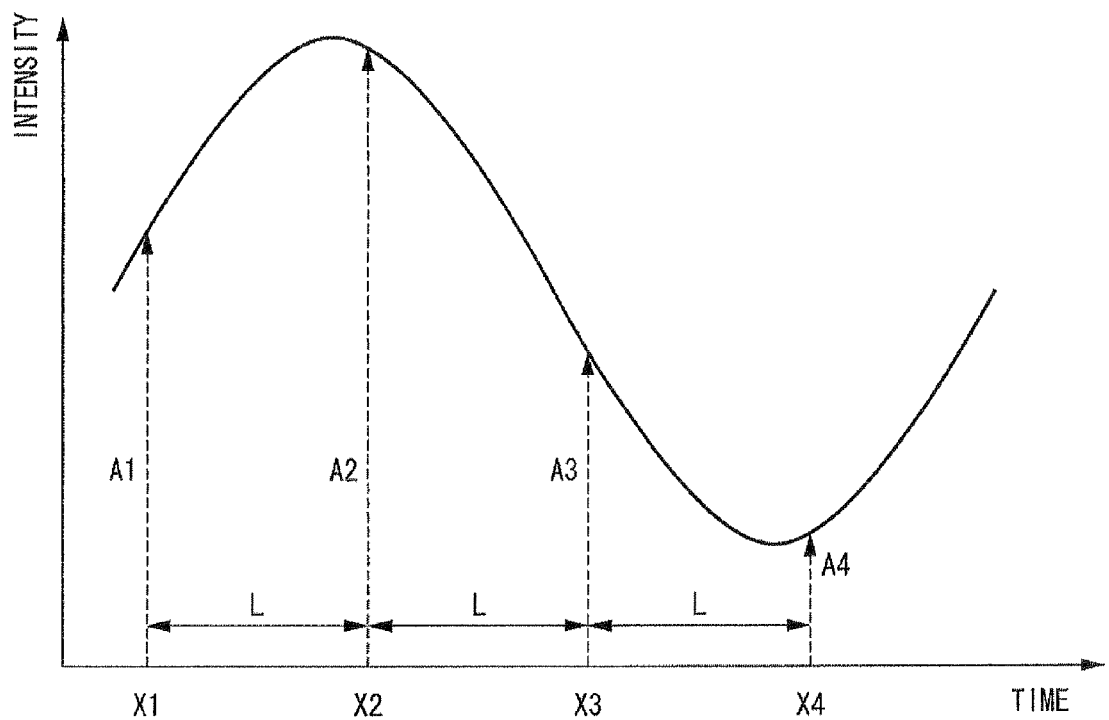
FIG. 11 is a diagram representing a concrete example of a method to calculate a phase according to an embodiment of the present invention.

FIG. 11 is a diagram representing a concrete example of a phase computation method performed by the phase computation unit 307. The phase computation unit 307 samples the values of the intensity of the light for measurement (A1 to A4) at a time interval which is one-fourth of a predetermined frequency of the light for measurement (X1 to X4). In FIG. 11, L represents the length of time which is one-fourth of the frequency of the light for measurement. The phase computation unit 307 computes the phase P of the light for measurement based on Formula 1 using the sampled values A1 through A4.

$$P = \tan^{-1} \frac{A2 - A4}{A1 - A3} \quad \text{(Formula 1)}$$

The phase computation unit 307 can sample the values A1 to A4 using any kind of method. Hereinafter, a concrete example of how the phase computation unit 307 samples the values A1 to A4 is described, along with a concrete example of a configuration of the light reception unit for measurement 302.

Figure 12:
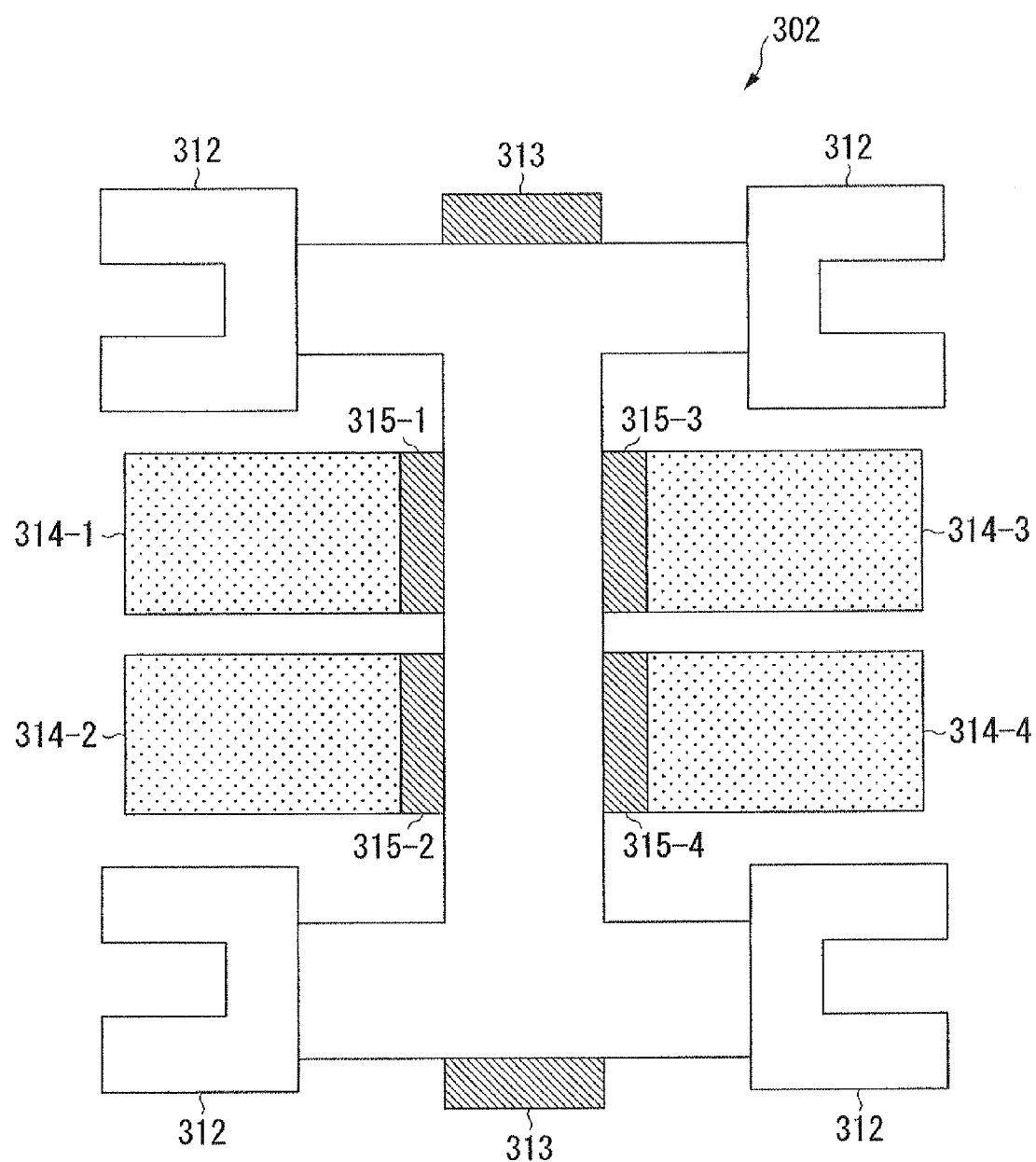
FIG. 12 is a diagram representing a concrete example of a configuration of a light reception unit for measurement according to an embodiment of the present invention.
Figure 13:
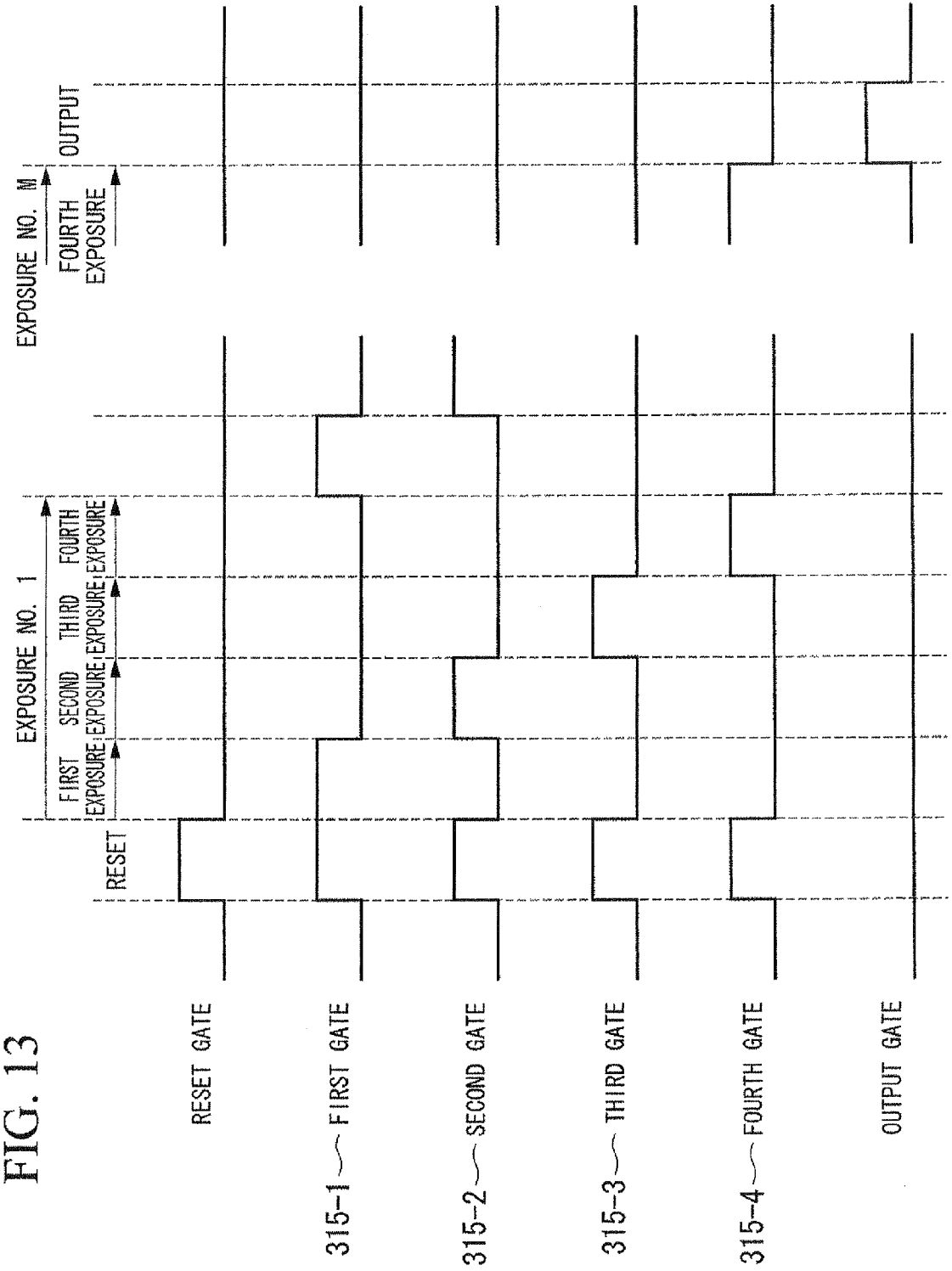
FIG. 13 is a timing chart representing a movement of a light reception unit for measurement according to an embodiment of the present invention.

FIG. 12 is a diagram representing a concrete example of a configuration of the light reception unit for measurement 302. FIG. 13 is a timing chart representing an operation of the light reception unit for measurement 302. The light reception unit for measurement 302 includes four photoelectric conversion units 312, two drain gate units 313, four charge accumulation units 314-1 to 314-4, and four gate units 315-1 to 315-4. First, the light reception unit for measurement 302 opens each of the gate units 315-1 to 315-4 at the time of reset. In addition, the light reception unit for measurement 302 opens a reset gate (not diagramed) at the time of reset. In this way, the light reception unit for measurement 302 resets the amount of accumulated charge by sweeping away the charge that was accumulated in the charge accumulation units 314-1 to 314-4 corresponding to each of the gate units 315-1 to 315-4. Then, the light reception unit for measurement 302 accumulates a charge corresponding to a predetermined number (m times, exposures No. 1 to No. m) of exposures to the charge accumulation units 314-1 to 314-4 by repeatedly opening each of the gates 315-1 to 315-4 in turn. More specifically, the light reception unit for measurement 302 opens the gate unit 315-1 at the time of a first exposure of exposure No. 1, and closes the other gate units 315-2 to 315-4. At this time, the charge accumulation unit 314-1 corresponding to the gate unit 315-1 accumulates the charge. Next, the light reception unit for measurement 302 opens the gate unit 315-2 at the time of a second exposure of exposure No. 1, and closes the other gate units 315-1, 315-3, and 315-4. At this time, the charge accumulation unit 314-2 corresponding to the gate unit 315-2 accumulates the charge. Next, the light reception unit for measurement 302 opens the gate unit 315-3 at the time of a third exposure of exposure No. 1, and closes the other gate units 315-1, 315-2, and 315-4. At this time, the charge accumulation unit 314-3 corresponding to the gate unit 315-3 accumulates the charge. Furthermore, the light reception unit for measurement 302 opens the gate unit 315-4 at the time of a fourth exposure of exposure No. 1, and closes the other gate units 315-1 to 315-3. At this time, the charge accumulation unit 314-4 corresponding to the gate unit 315-4 accumulates the charge. This concludes exposure No. 1.

The duration of the exposure is the same for each of the first to fourth exposures. The duration of time from the start of the first exposure to the end of the fourth exposure is equal to the cycle of the light for measurement that is emitted from the luminescent device 2a. Therefore, the duration of each of the first to four exposures equals one-fourth of the cycle of the light for measurement. After of the each gate units 315-1 to 315-4 repeats this exposure for m times, the electric charge that was accumulated in each charge accumulation unit 314-1 to 314-4 is respectively outputted as the values of A1 to A4.

Next, the position measurement device 3a is further described with reference to FIG. 6. The standard luminescent device selection unit 308 selects the light for measurement that has the most lagging phase relative to other light for measurement that was received by the representative cluster of the light reception unit of each group. The standard luminescent device selection unit 308 then selects a luminescent device 2a as the standard luminescent device. Here, the standard luminescent device selection unit 308 selects the luminescent device 2a that was the luminescent source of the above light for measurement, The phase difference computation unit 309 computes the phase difference of a light for measurement that was emitted from the standard luminescent device and a light for measurement of another luminescent device 2a (hereinafter referred to as an "ordinary luminescent device"). The light for measurement of the ordinary luminescent device is received by the light reception unit 301a. The phase difference computation unit 309 computes the phase difference in this way for all of the ordinary luminescent devices.

The position computation unit 310a computes the present position of the position measurement device 3a, based on the phase difference of the light for measurement that was computed for each of the ordinary luminescent device by the phase difference computation unit 309, and also based on the positions of each of the luminescent devices 2a that are stored in the luminescent device position storing unit 304. Hereinafter, a concrete example of a procedure performed by the position computation unit 310 is presented.

Figure 14:
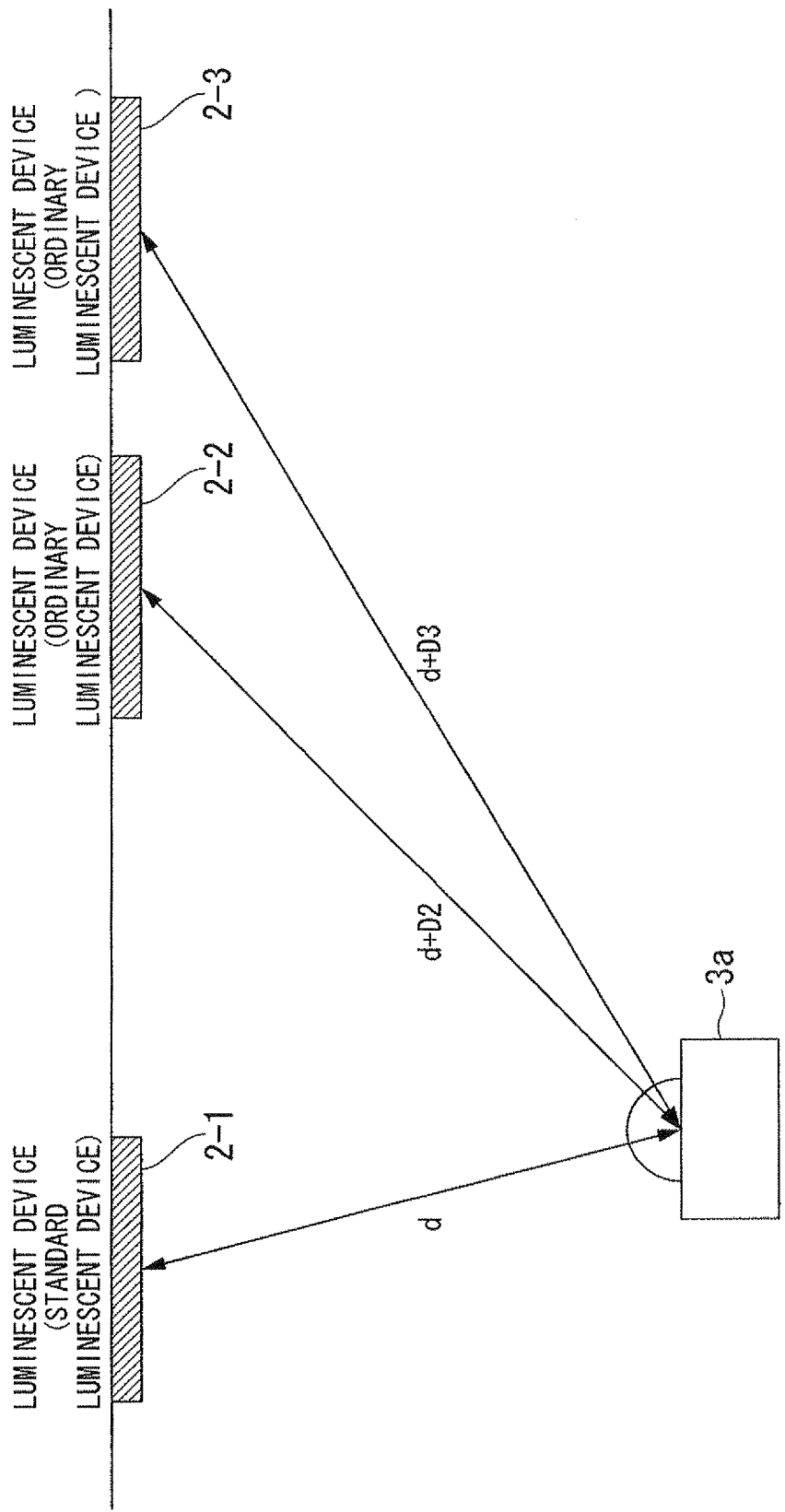
FIG. 14 is a skeletal diagram representing a positional relationship between a standard luminescent device, an ordinary luminescent device, and a localization device according to an embodiment of the present invention.

FIG. 14 is a skeletal diagram representing the positional relationship among the standard luminescent device, the ordinary luminescent device, and the position measurement device 3a. In FIG. 14, the luminescent device 2-1 is the standard luminescent device, and the luminescent devices 2-2 and 2-3 are the ordinary luminescent devices. Furthermore, in the following description, the luminescent device 2-5 (not diagramed) is also considered to be an ordinary luminescent device. The distance between the position measurement device 3a and the standard luminescent device is referred to as d, and the distance between the position measurement device 3a and each of the luminescent devices 2-i is referred to as d+D+i. For example, in FIG. 14, the distance between the position measurement device 3a and the luminescent device 2-2 is referred to as d+D2. Meanwhile, the distance between the position measurement device 3a and the luminescent device 2-3 is referred to as d+D3. Here, Di is expressed as shown in Formula 2.

$$Di = l \times \frac{Pi}{\pi} \quad \text{(Formula 2)}$$

In Formula 2, Pi is the phase difference between the ordinary luminescent device (luminescent device 2-$i$) and the standard luminescent device. Pi is a value computed by the phase difference computation unit 309. In Formula 2, $\pi$ represents the circumference ratio. Furthermore, l in Formula 2 is represented as shown in Formula 3.

$$l = \frac{c}{F} \quad \text{(Formula 3)}$$

In Formula 3, c represents the velocity of light, while F represents the frequency of the light for measurement.

Furthermore, the position of the luminescent device 2-$i$ is referred to as (Xi, Yi, Zi), and the position of the position measurement device 3a is referred to as (x, y, z). Here, the relationship between each value can be represented as shown in Formula 4. Considering Formula 4, if the luminescent device 2-$i$ is the standard luminescent device, the value of Di equals zero.

$$\sqrt{(Xi-x)^2+(Yi-y)^2+(Zi-z)^2}=Di+d \quad \text{(Formula 4)}$$

The position computation unit 310a plugs in values for both the standard luminescent device and the ordinary luminescent device into the Formula 4. In this way, the position computation unit 310a creates four equations for the four variables x, y, z, and d. Then, the position computation unit 310a computes the position (x, y, z) of the position measurement device 3a by solving the four equations.

Figure 15:
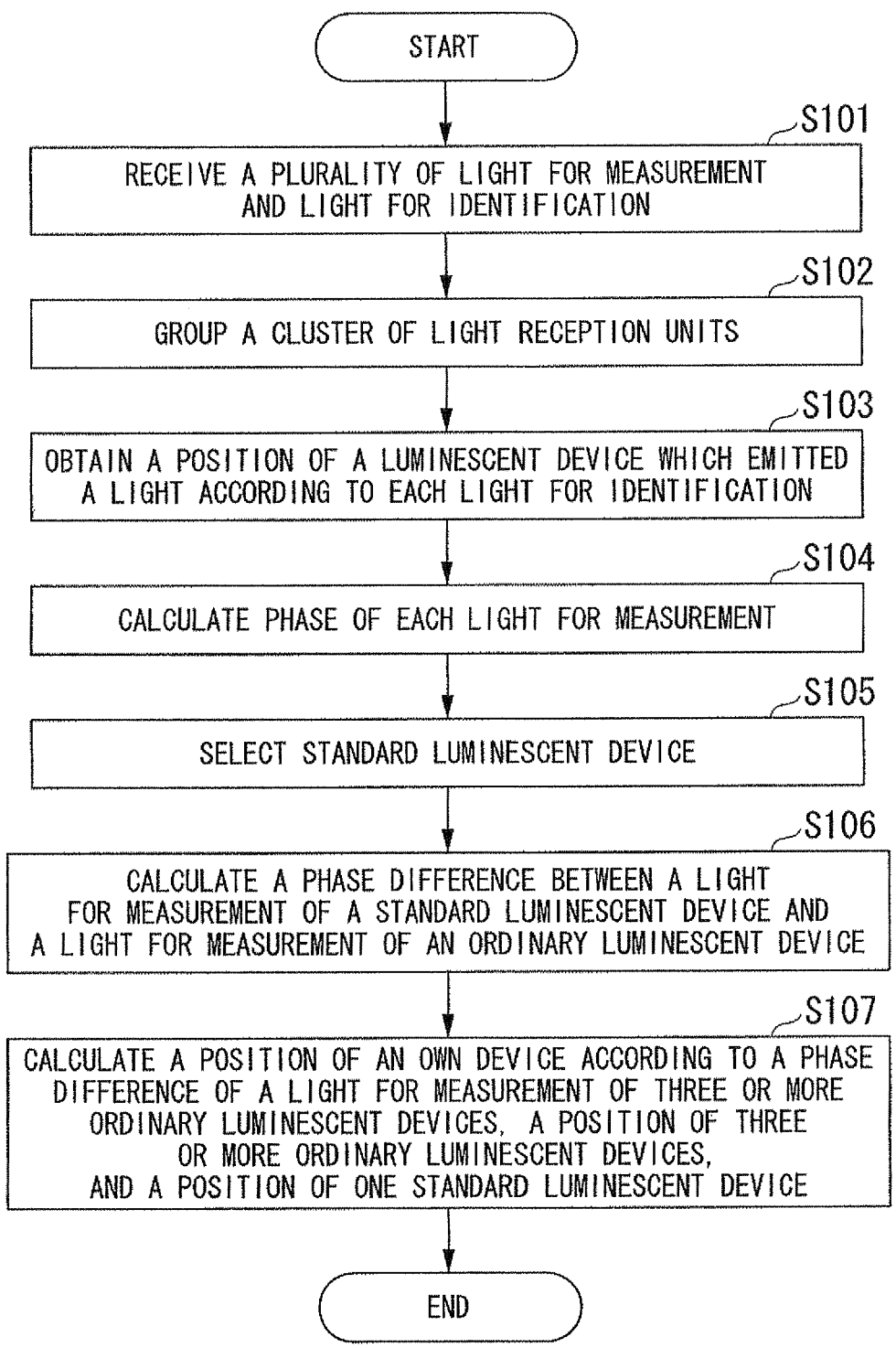
FIG. 15 is a flowchart representing an example of an operation of a localization device according to a first embodiment of the present invention.

FIG. 15 is a flowchart representing an example of an operation performed by the position measurement device 3a according to the first embodiment of the present invention. First, the light reception unit 301a receives multiple lights for measurement and lights for identification (step S101). In particular, since the position measurement device 3a moves freely in each direction of the axes of a three-dimensional system, the position measurement device 3a receives light for measurement and light for identification that was emitted from four or more luminescent devices 2a. Next, the clustering unit 305 groups the cluster of light reception units 311 (step S102). Then, the position obtaining unit 306 obtains the position of the luminescent device 2a that emitted the light for measurement received by the representative of the cluster of light reception units 311 of each group (step S103). In this step S103, the position obtaining unit 306 obtains the position of the luminescent device 2a based on the light for identification that was received by the representative of the cluster of light reception units 311 of each group.

Next, the phase computation unit 307 computes the phase of the light for identification that was received by the representative of the cluster of light reception units 311 of each group (step S104). Next, the standard luminescent device selection unit 308 detects the light for measurement that has the most relatively lagging phase, and selects the luminescent device 2a that emitted this light for measurement as the standard luminescent device (step S105). Next, the phase difference computation unit 309 computes the phase difference of the light for measurement of the standard luminescent device and the light for measurement of the ordinary luminescent device (step S106). In step S106, the phase difference computation unit 309 computes the phase difference for each of the ordinary luminescent devices. Then, the position computation unit 310a computes the position of the own device, based on the phase difference of the light for measurement for three or more ordinary luminescent devices, and based on the positions of three or more ordinary luminescent devices and one standard luminescent device (step S107).

According to the first embodiment of the position measurement system 1 configured as described above, the position measurement device 3a measures the position of the own device by receiving the light emitted by a plurality of (four or more) luminescent devices 2a. At this time, the position measurement device 3a obtains the phase of the waveform represented by the change in the intensity of the received light. The position measurement device 3a also obtains the timing of the on-off operations. Thus, it is not necessary to form an image of the received light on the light reception element. Therefore, the position measurement device 3a does not need to adjust the focus (focal point) of the light that was received by the luminescent device 2a. Therefore, the position can be measured with simple operations. In other words, even though the light received by the luminescent device 2a is out of focus, the position measurement device 3a can accurately measure the position.

Hereinafter, a variation of the first embodiment of the present invention is described. The synchronous adjustment unit 201 may output a synchronous signal that is in synchrony with another luminescent device 2a, without communicating with a synchronous adjustment unit 201 of the other luminescent device 2a, by being equipped with a precise clock (for example, an atomic clock) that is already in synchrony with another luminescent device 2a. When the synchronous adjustment unit 201 is configured in this way, the luminescent device 2a and the other luminescent device 2a do not need to transmit and receive a synchronous adjustment signal between each other. Therefore, in this case, it is no longer necessary to connect each luminescent device 2a as shown in FIG. 2 so that communication can be made.

The luminescent unit for identification 204 does not need to associate identifying information with a light for identification. Instead, the luminescent unit for identification 204 may associate the spatial coordinate of the position of the luminescent device 2a with the light for identification. In this case, the position measurement device 3a does not need to be equipped with the luminescent device position storing unit 304. Thus, the position obtaining unit 306 extracts the spatial coordinates of the position of each luminescent device 2a from the light for identification.

Furthermore, the position measurement device 3a may be configured to move in the x-y plane so that value of the z-coordinate does not change. In this case, the variable z in Formula 4 becomes a predetermined value. Therefore, the position measurement device stores a predetermined value of the variable z. In this way, the position measurement device can measure the position by receiving light for measurement from three or more luminescent devices 2a. Similarly, the position measurement device 3a can be configured to move only along the x-axis so that the values of the y-coordinate and the z-coordinate do not change. In this case, the variables y and z in Formula 4 become a predetermined value. Therefore, the position measurement device 3a stores predetermined values of the variables y and z. In this way, the position measurement device can measure the position by receiving light for measurement from two or more luminescent devices 2a. As described above, the position measurement device 3a can be configured to move along n-number of axis. Here, n is an integer greater than or equal to one. Thus, the number of luminescent devices 2a that are set up in this case is greater than or equal to n+1.

Figure 16:
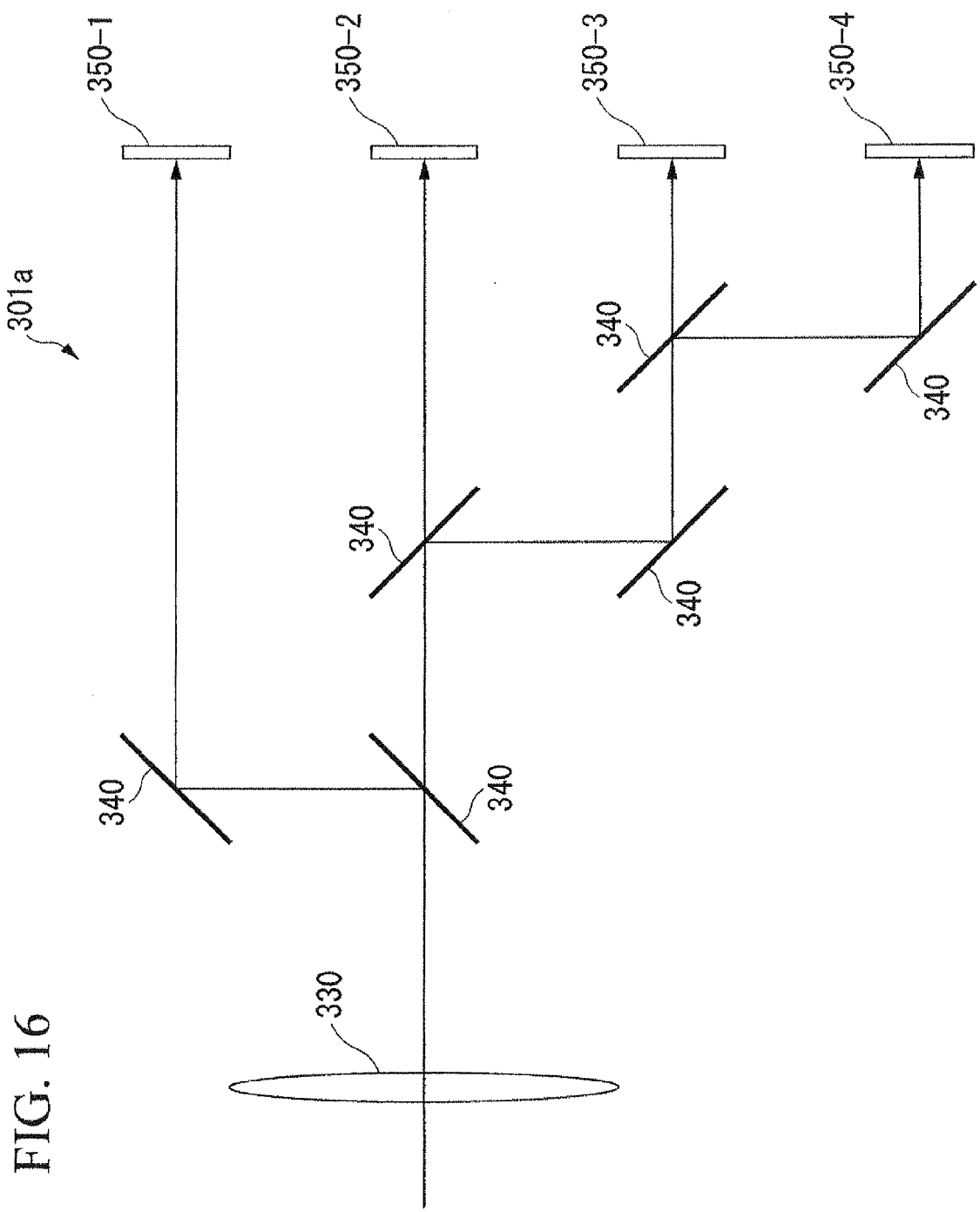
FIG. 16 is a configuration diagram of a variation of a light reception unit according to an embodiment of the present invention.

FIG. 16 is a configuration diagram of a variation of the light reception unit 301a. In this case, the light for measurement and the light for identification that passed through the lens 330 are split into four streams via a plurality of half mirrors (also referred to as a beam splitter). Each of the four streams reaches, respectively, the light reception platforms 350-1 to 350-4. Each of the light reception platforms 350-1 to 350-4 receives the light that reached the respective platform.

Figure 17:
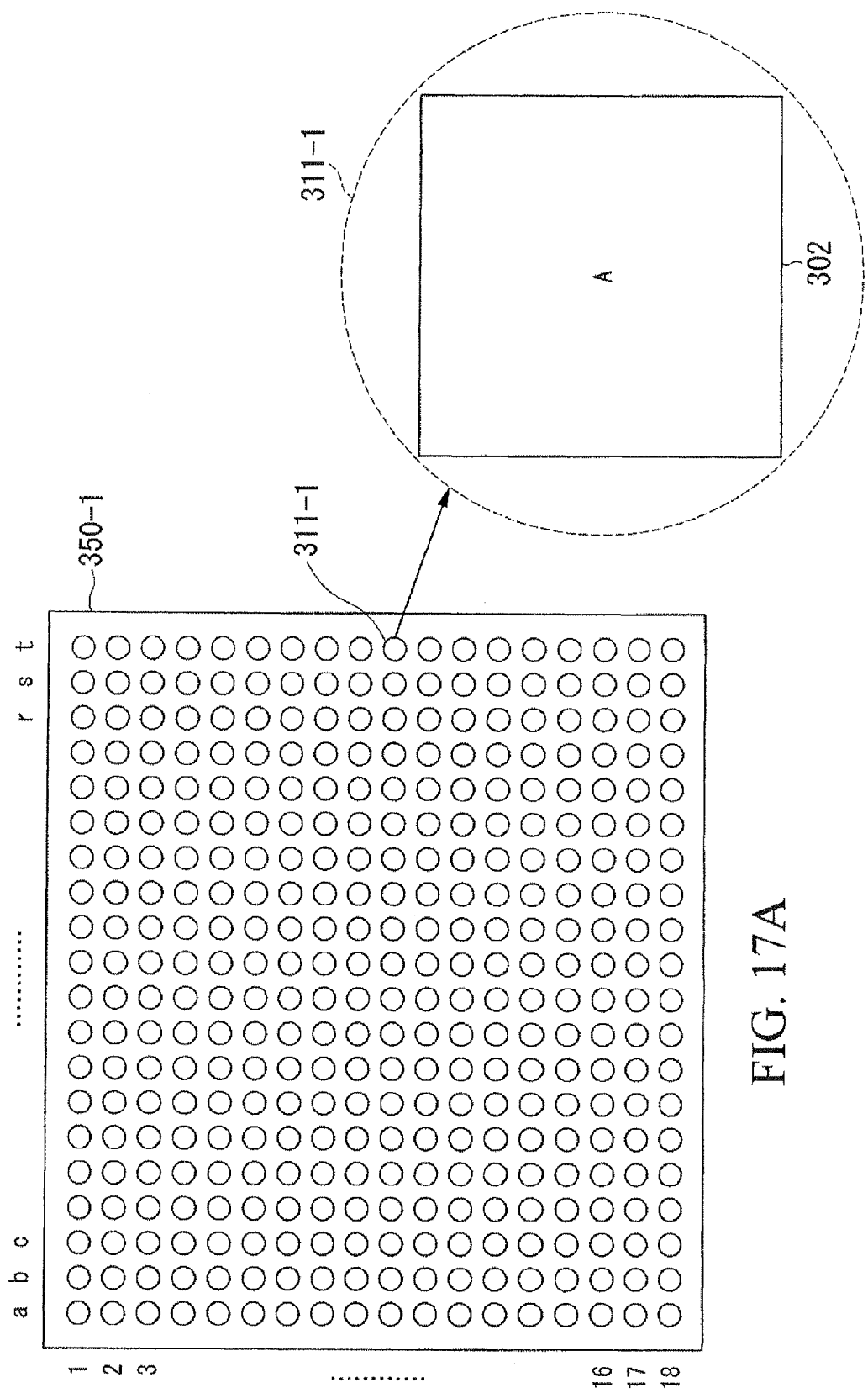
FIG. 17 is a diagram representing an example of a configuration of a light receiving platform in a case in which a light reception unit is configured as shown in FIG. 16 according to an embodiment of the present invention.

FIG. 17 is a diagram representing an example of a configuration of the light reception platform 350 when the light reception unit 301a is configured as shown in FIG. 16. In FIG. 17, the light reception platform 350-1 is diagramed as an example. In this case, one cluster of light reception units 311-1 includes one light reception unit for measurement 302 (A). Therefore, the magnitude of the cluster of light reception units 311 becomes approximately one-fourth, compared to the case shown in FIG. 8 where four light reception elements are included. Further, the magnitude of the light reception platform 350-1 in the present case becomes approximately one-fourth of the magnitude of the light reception platform 350 shown in FIG. 8. Similar to the light reception platform 350-1, the cluster of light reception units 311-2 of the light reception platform 350-2 includes one light reception unit for measurement 302(B). Similarly, the cluster of light reception units 311-3 of the light reception platform 350-3 includes one light reception unit for measurement 302(C). Similarly, the cluster of light reception units 311-4 of the light reception platform 350-4 includes one light reception unit for measurement 302(D). In other words, each of the light reception platforms 350-1 to 350-4 includes one type of light reception element chosen from among A through D. According to this configuration, it is possible to reduce the size of each of the light reception platforms 350-1 to 350-4.

Figure 18:
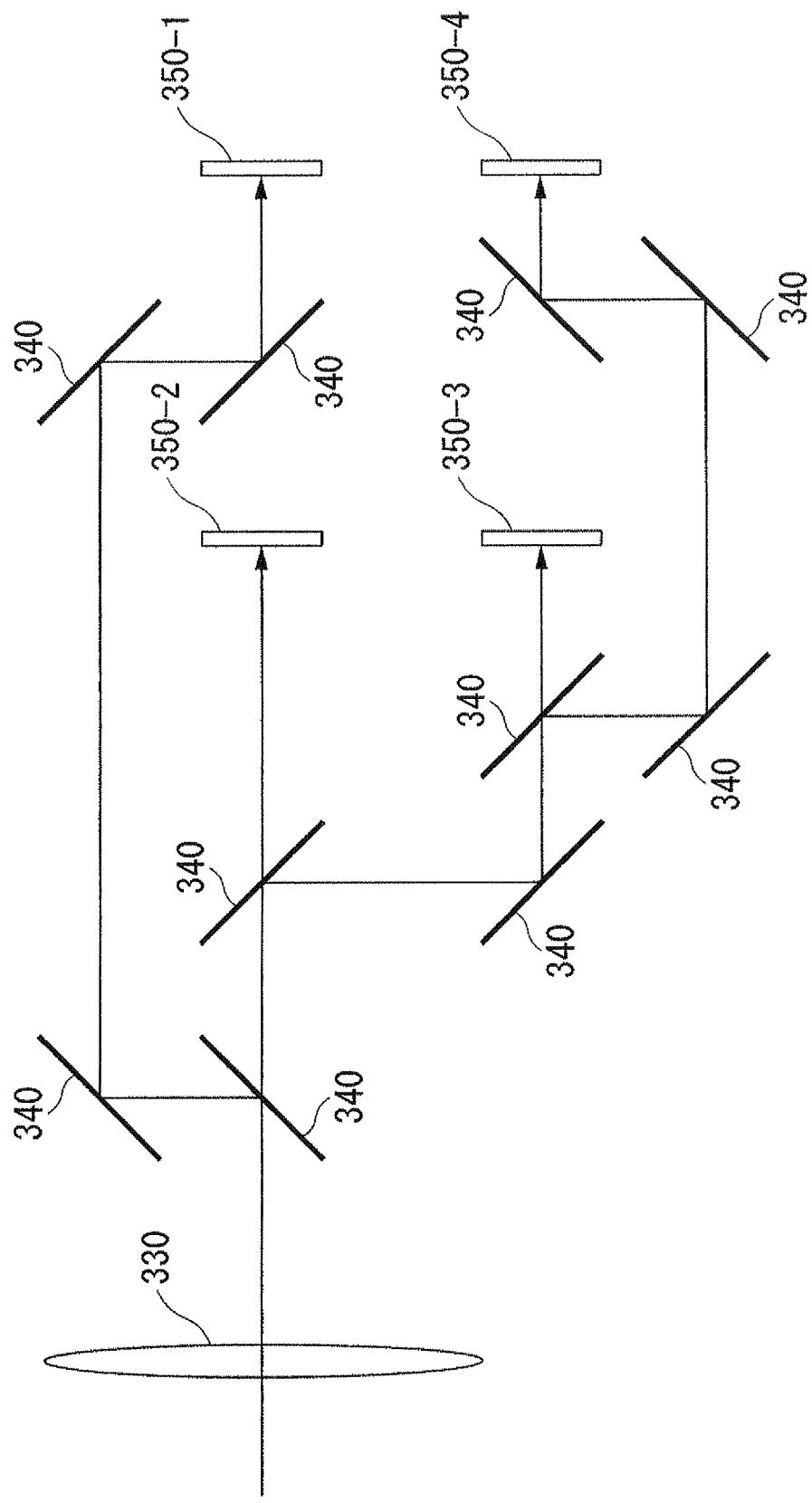
FIG. 18 is a diagram representing another variation of a light reception unit according to an embodiment of the present invention.

FIG. 18 is a diagram representing another variation of the light reception unit 301a. When a half mirror 340 is used for the light reception unit 301a, a plurality of light reception platforms 350-i can be positioned to overlap with the direction of the light, as shown in FIG. 18, so that a light reception plane of a light reception platform 350 and a backside plane of another light reception platform 350 face one another. For example, in FIG. 18, the light reception platform 350-1 and the light reception platform 350-2 are placed to overlap with one another. By configuring the light reception unit 301a in this way, the size of the light reception unit 301a can be reduced compared to the case in which all of the light reception platforms 350 are arranged without overlapping with one another as shown in FIG. 16, for example. Meanwhile, regarding a configuration in which a half mirror 340 is used for the light reception unit 301a, the arrangement of the half mirror 340 and the light reception platform 350 is not limited to the arrangements shown in FIG. 16 and FIG. 18. The arrangement can be made in other ways as well.

Second Embodiment

Figure 19:
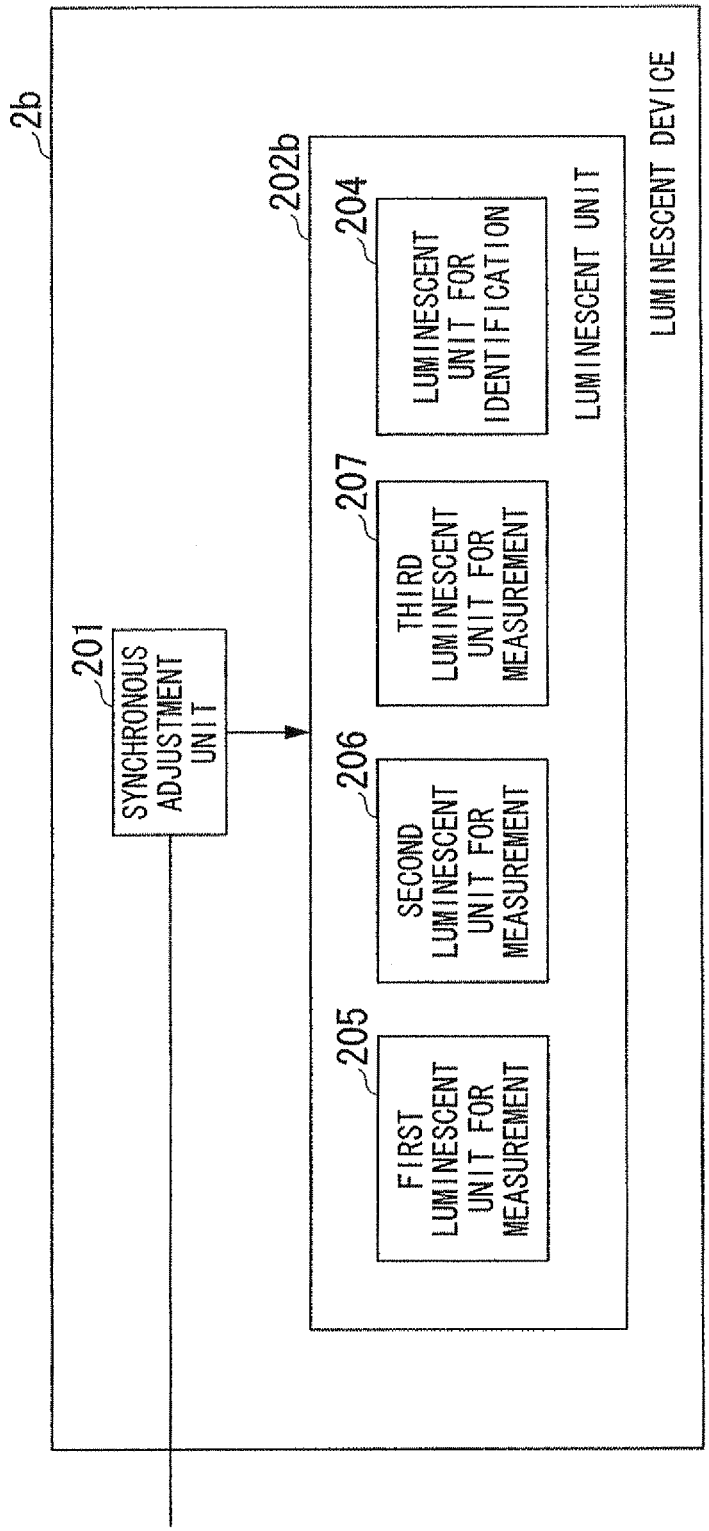
FIG. 19 is a skeletal block diagram representing a functional configuration of a luminescent device, the luminescent device being a second embodiment of a luminescent device of a localization system according to an embodiment of the present invention.

Hereinafter, a second embodiment is described. FIG. 19 is a skeletal block diagram representing the functional configuration of a luminescent device 2b which is a second embodiment of the luminescent device 2 of the position measurement system 1. The functional unit that is the same as that of the luminescent device 2a of the first embodiment is referred to in FIG. 19 using the same reference numeral used in FIG. 3, and will not be described again.

The luminescent device 2b is different from the luminescent device 2a in that the luminescent device 2b includes a luminescent unit 202b instead of the luminescent unit 202a. Otherwise, the configuration of the luminescent device 2b is the same as that of the luminescent device 2a. The luminescent unit 202b includes a first luminescent unit for measurement 205, a second luminescent unit for measurement 206, a third luminescent unit for measurement 207, and a luminescent unit for identification 204.

The first luminescent unit for measurement 205, the second luminescent unit for measurement 206, and the third luminescent unit for measurement 207 each emit a light for measurement that has a predetermined cycle that is different from one another. The first to third luminescent units for measurement 205, 206, and 207 each emit a light for measurement in synchrony with another luminescent device 2b according to the synchronous adjustment unit 201. Hereinafter, the light for measurement emitted by each of the first to third luminescent units for measurement 205, 206, and 207 are respectively referred to as the first light for measurement, the second light for measurement and the third light for measurement.

Figure 20:
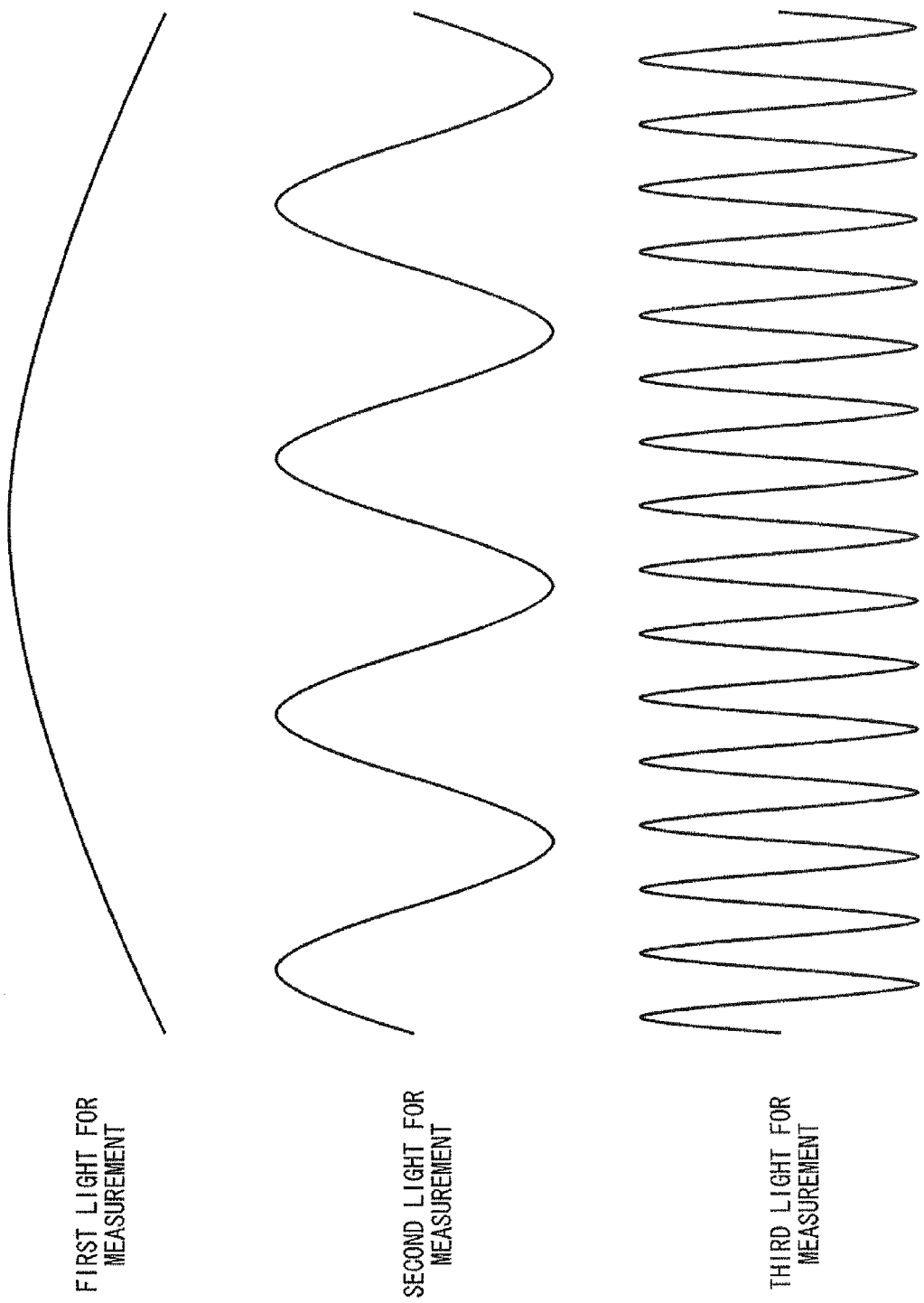
FIG. 20 is a diagram representing a concrete example of a waveform of a first, second and third light for measurement according to an embodiment of the present invention.

FIG. 20 is a diagram representing a concrete example of a waveform of the first, second, and third light for measurement. Each of the cycles of the first, second, and third light for measurement is respectively referred to as T1, T2, and T3. Here, the relationship between T1, T2, and T3 can be expressed as T1>T2>T3.

Figure 21:
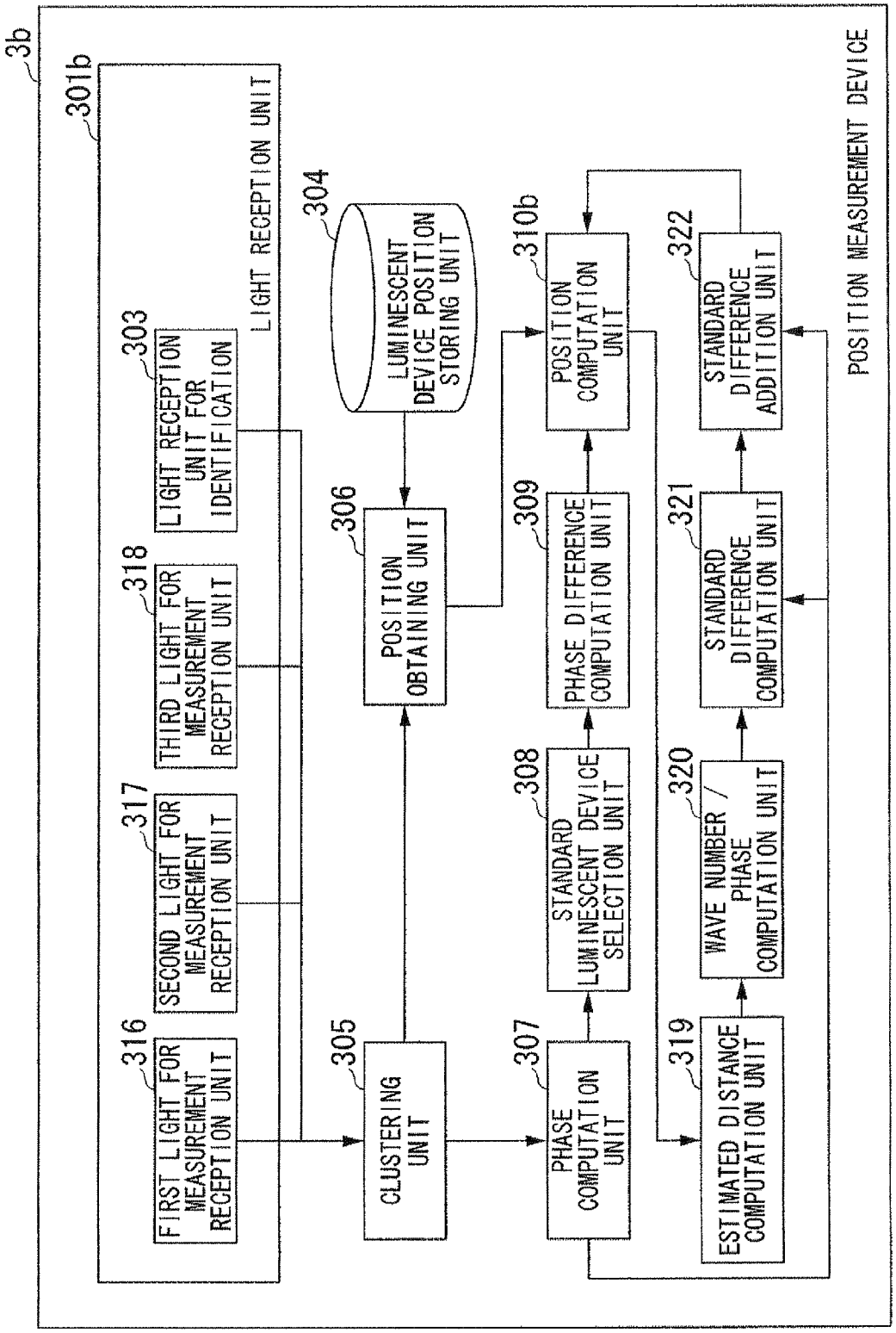
FIG. 21 is a skeletal block diagram representing a functional configuration of a localization device, the localization device being a second embodiment of a localization device of a localization system according to an embodiment of the present invention.

FIG. 21 is a skeletal block diagram representing the functional configuration of a position measurement device 3b which is a second embodiment of the position measurement device 3 of the position measurement system 1. The functional unit that is the same as that of the position measurement device 3a of the first embodiment is referred to in FIG. 21 using the same reference numeral used in FIG. 6, and will not be described again. The position measurement device 3b includes a light reception unit 301b, a luminescent device position storing unit 304, a clustering unit 305, a position obtaining unit 306, a phase computation unit 307, a standard luminescent device selection unit 308, a phase difference computation unit 309, a position computation unit 310b, an estimated distance computation unit 319, a wave number/phase computation unit 320, a standard difference computation unit 321, and a standard difference addition unit 322.

The luminescent unit 301b is different from the light reception unit 301a in that the luminescent unit 301b includes a reception unit for receiving the first light for measurement 316 (hereinafter referred to as the "first light reception unit for measurement 316"), a reception unit for receiving the second light for measurement 317 (hereinafter referred to as the "second light reception unit for measurement 317"), and a reception unit for receiving the third light for measurement 318 (hereinafter referred to as the "third light reception unit for measurement 318"). Otherwise, the luminescent unit 301b is configured similar to the light reception unit 301a. Each of the first to third light reception units for measurement 316, 317, and 318 is a light reception unit for measurement 302 configured to correspond to, respectively, the first, second, and third light for measurement. For example, when the first to third light reception units for measurement 316, 317, and 318 are configured as shown in FIG. 12, the timing of the exposure is set according to the frequency of the first, second, and third light for measurement. In this case, the light reception unit for measurement A in the cluster of light reception units 311 shown in FIG. 8B is configured as the first light reception unit for measurement 316. In addition, the light reception unit for measurement B is configured as the second light reception unit for measurement 317. Further, the light reception unit for measurement C is configured as the third light reception unit for measurement 318. Finally, the light reception unit for measurement D is configured as the light reception unit for identification 303. According to this configuration, one cluster of light reception units 311 can receive the first light for measurement, the second light for measurement, the third light for measurement, and the light for identification.

The position computation unit 310b computes the position of the own device by processing the first light for measurement in the same way as the position computation unit 310a. Meanwhile, the position computation unit 310b computes the position of the own device by performing a different process on the second and third light for measurement. The operation of the position computation unit 310b is described later in detail. The processing and computation of position computation unit 310a and position computation unit 310b, as well as that of other units such as that of the phase difference computation unit 309, may be performed by a processor.

The estimated distance computation unit 319 computes the distance (estimated distance) between the own device and each of the luminescent devices based on the position of the own device computed by the position computation unit 310b.

Based on the estimated distance computed by processing a certain light for measurement, the wave number/phase computation unit 320 computes the wave number and the phase (standard phase) of another light for measurement that has a shorter cycle, between the own device and the standard luminescent device. In particular, based on the estimated distance regarding the standard luminescent device computed by processing the first light for measurement, the wave number/phase computation unit 320 computes the wave number and the standard phase of the second light for measurement between the own device and the standard luminescent device. In addition, based on the estimated distance regarding the standard luminescent device computed by processing the second light for measurement, the wave number/phase computation unit 320 computes the wave number and the standard phase of the third light for measurement between the own device and the standard luminescent device. This computation is carried out by, for example, dividing the estimated distance by the wavelength of the light for measurement, obtaining the resulting quotient (the integer portion of the result of the division) as the wave number, and further computing the phase based on the remainder computed by the division operation.

Based on the estimated distance regarding each of the ordinary luminescent devices, the wave number/phase computation unit 320 computes the wave number of the light for measurement having the cycle that was used to compute the standard phase. Here, the wave number/phase computation unit 320 computes the wave number between the own device and each of the ordinary luminescent devices.

The standard difference computation unit 321 computes the standard difference by subtracting the phase computed by the phase computation unit 307, regarding a light for measurement of the standard luminescent device, from the phase computed by the wave number/phase computation unit 320 regarding the same light for measurement of the standard luminescent device.

Regarding a light for measurement having the same frequency as a light for measurement that is processed by the standard difference computation unit 321, the standard difference addition unit 322 adds the standard difference to the phase of the light for measurement of each of the ordinary luminescent devices computed by the phase computation unit 307.

Figure 22:
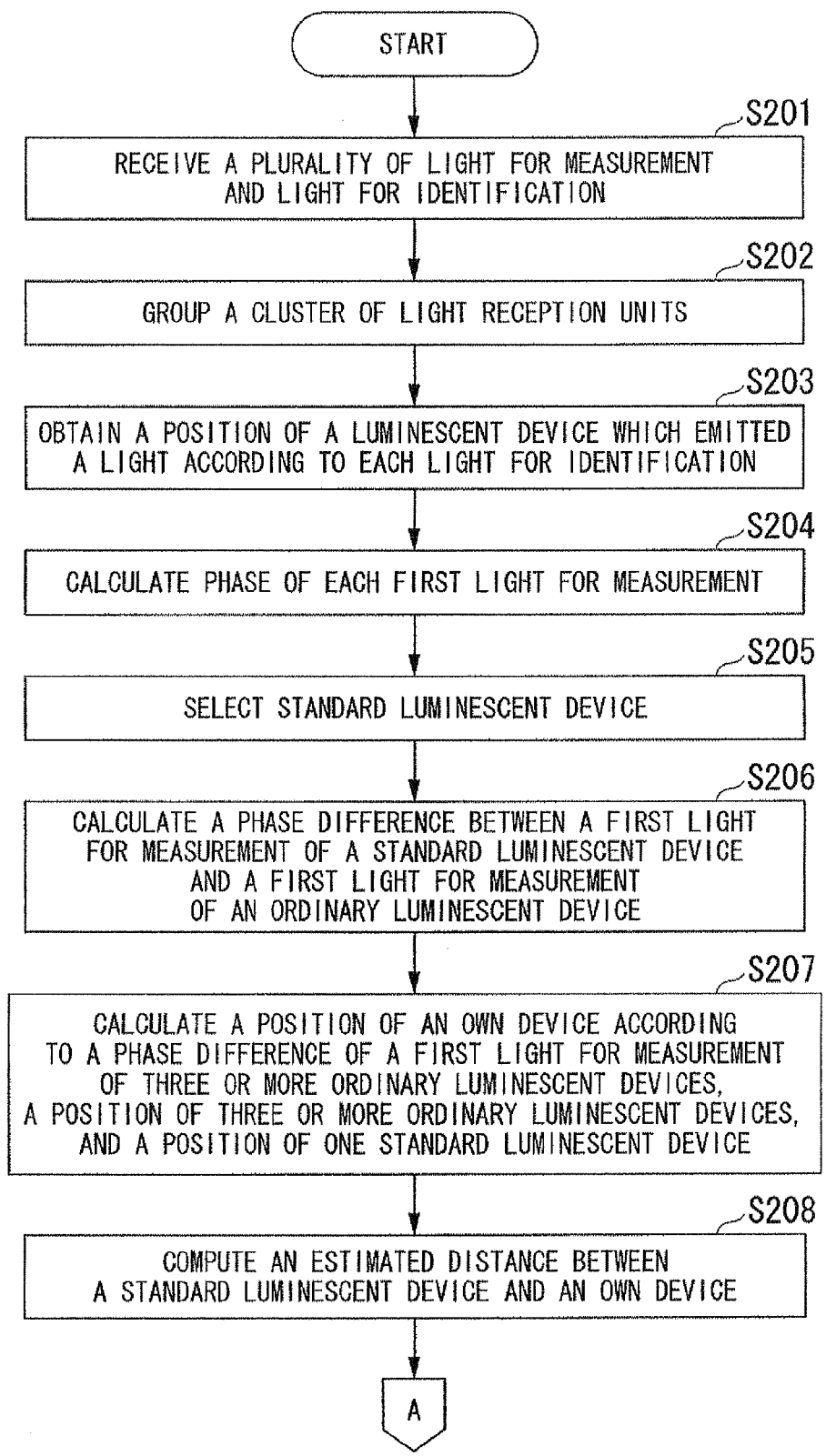
FIG. 22 is a flowchart representing an example of an operation of a localization device according to a second embodiment of the present invention.
Figure 23:
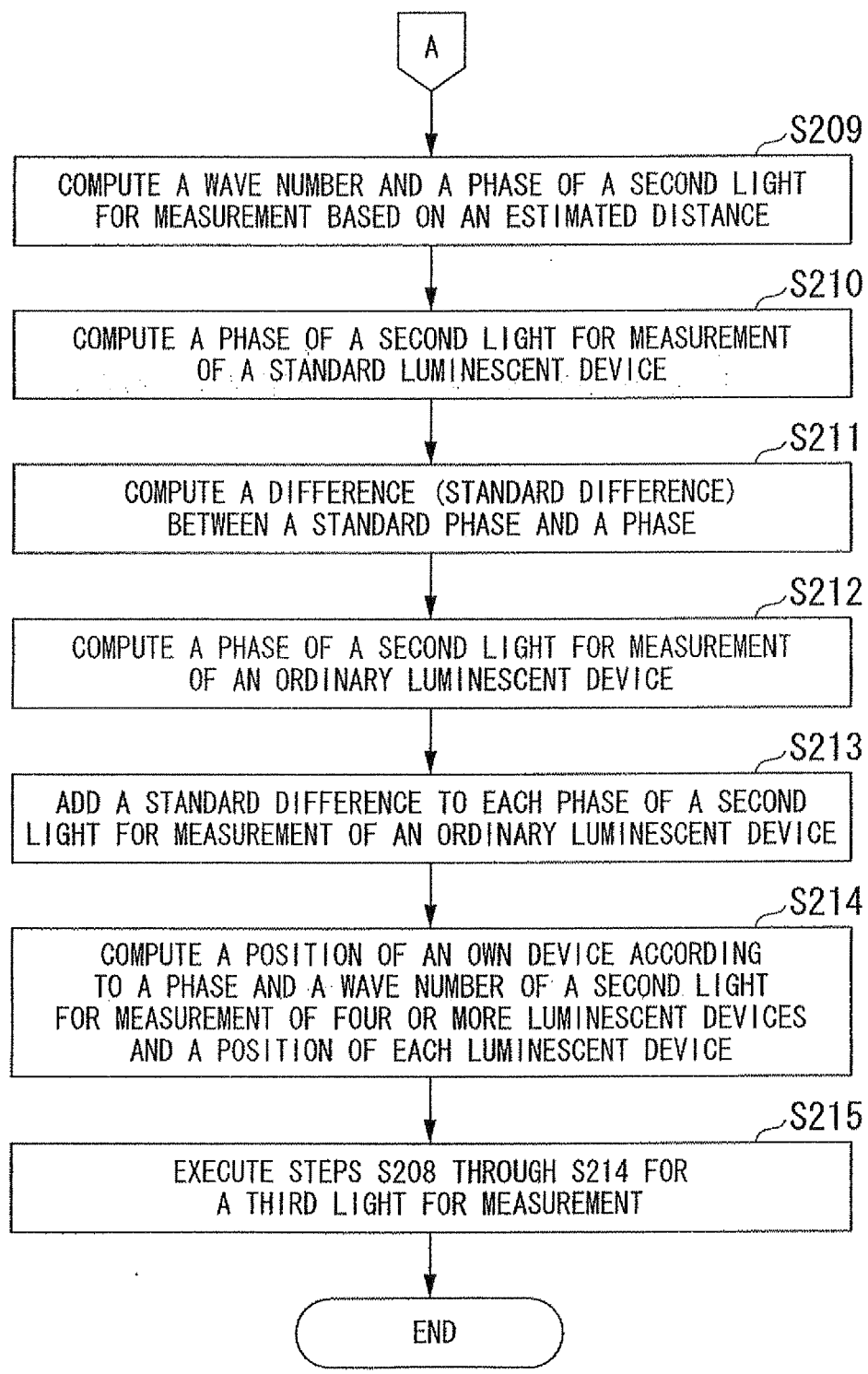
FIG. 23 is a flowchart representing an example of an operation of a localization device according to a second embodiment of the present invention.

FIGS. 22 and 23 represent a flowchart indicating an example of an operation of the position measurement device 3b according to the second embodiment. Hereinafter, the operation of the position measurement device 3b according to the second embodiment is described with reference to FIGS. 22 and 23.

First, the light reception unit 301b receives a plurality of light for measurement and light for identification (step S201). In particular, since the position measurement device 3b moves freely in each direction of the axes of a three-dimensional system, the light for measurement and the light for identification emitted by four or more luminescent devices 2b is received. Next, the clustering unit 305 groups the cluster of light reception units 311 (step S202). Then, based on the light for identification received by the representative of the cluster of light reception units 311 of each group, the position obtaining unit 306 obtains the position of the luminescent device 2b that emitted the light for measurement received by this class (step S203).

Next, the phase computation unit 307 computes the phase of the first light for identification received by the representative of the cluster of light receiving units 311 of each group (step S204). Next, the standard luminescent device selection unit 308 detects the first light for measurement that has the most relatively lagging phase, and selects the luminescent device 2b that emitted this first light for measurement as the standard luminescent device (step S205). Next, for each ordinary luminescent device, the phase difference computation unit 309 computes the phase difference between the first light for measurement of the standard luminescent device and the first light for measurement of the ordinary luminescent device (step S206). Then, the position computation unit 310b computes the position of the own device, based on the phase difference among the first light for measurement of three or more ordinary luminescent devices and the positions of three or more ordinary luminescent devices and one standard luminescent device (step S207).

Next, based on the position of the own device computed in step S207, the estimated distance computation unit 319 computes the distance (estimated distance) between the own device and the standard luminescent device (step S208). In particular, the estimated distance computation unit 319 computes the estimated distance by using the spatial coordinates of the position of the standard luminescent device stored in the luminescent device position storing unit 304 and the spatial coordinates of the position of the own device computed by the operation in step S207.

Next, the wave number/phase computation unit 320 computes the wave number and the phase of the second light for measurement of the standard luminescent device and the ordinary luminescent device according to the estimated distance (step S209; hereinafter, referring to FIG. 23). Next, the phase computation unit 307 computes the phase of the second light for measurement of the standard luminescent device (step S210). Next, the standard difference computation unit 321 computes the standard difference by subtracting the phase, computed by the phase computation unit 307 in step S210, from the phase (standard phase) computed by the wave number/phase computation unit 320 in step S209 (step S211).

Next, the phase computation unit 307 computes the phase of the second light for measurement of each ordinary luminescent device (step S212). Next, the standard difference addition unit 322 adds the standard difference, computed in step S211, to the phase of the second light for measurement of each ordinary luminescent device computed by the phase computation unit 307 in step S212 (step S213).

Next, the position computation unit 310b computes the value of Di for each ordinary luminescent device (luminescent device 2-i) based on Formula 5.

$$Di = l \times \frac{Rad}{\pi} + l \times Num \qquad \text{(Formula 5)}$$

In Formula 5, Rad represents the phase of the second light for measurement of each ordinary luminescent device after the standard difference was added in step S213. In addition, Num represents the wave number of the second light for measurement that exists between the own device and each ordinary luminescent device. The position computation unit 310b plugs in the values of Di for each ordinary luminescent device into Formula 4 for each of the standard luminescent devices and the ordinary luminescent device. In this way, the position computation unit 310b creates four equations for the four variables x, y, z, and d. Then, the position computation unit 310b computes the position (x, y, z) of the position measurement device 3b by solving these four equations (step S214).

Furthermore, the position computation unit 310b computes the position of the position measurement device 3b by executing steps S208 to S214 with respect to the third light for measurement (step S215).

According to the position measurement device 3b according to the second embodiment configured in this way, the position is computed by using a light for measurement having multiple cycles. In particular, the position measurement device 3b computes the estimated distance based on the position of the own device that was computed using a light for measurement having a long cycle. Then, the position measurement device 3b executes an operation using the value of the estimated distance and a light for measurement having a short cycle. In this way, the position measurement device 3b can compute the position with more precision, compared to the case in which the position of the own device is computed using a light for measurement having a long cycle.

Hereinafter, a variation of the second embodiment of the present invention is described. The ratio between the cycle of the first light for measurement (T1) and the cycle of the second light for measurement (T2) can be set to be expressed as an integral ratio. Similarly, the ratio between the cycle of the second light for measurement (T2) and the cycle of the third light for measurement (T3) can be set to be expressed as an integral ratio. According to this configuration, it is possible to reduce the noise from the light for measurement having other cycles, when the first, second, and third light reception units for measurement 316, 317, and 318 respectively receive the corresponding first, second, and third light for measurement.

When the values of T1/T2 and T2/T3 are too large, the accuracy of the operations performed by the wave number/phase computation unit 320 and the standard difference computation unit 321 declines. On the other hand, when the values of T1/T2 and T2/T3 are too small, the accuracy of the computed position of the own device will not be enhanced enough. As a result, the values of T1/T2 and T2/T3 may each be set to a value greater than 1 and less than or equal to 20. According to this configuration, a reasonable tradeoff can be made. More preferably, the values of T1/T2 and T2/T3 may each be set to a value greater than or equal to 2 and less than or equal to 5.

Figure 24:
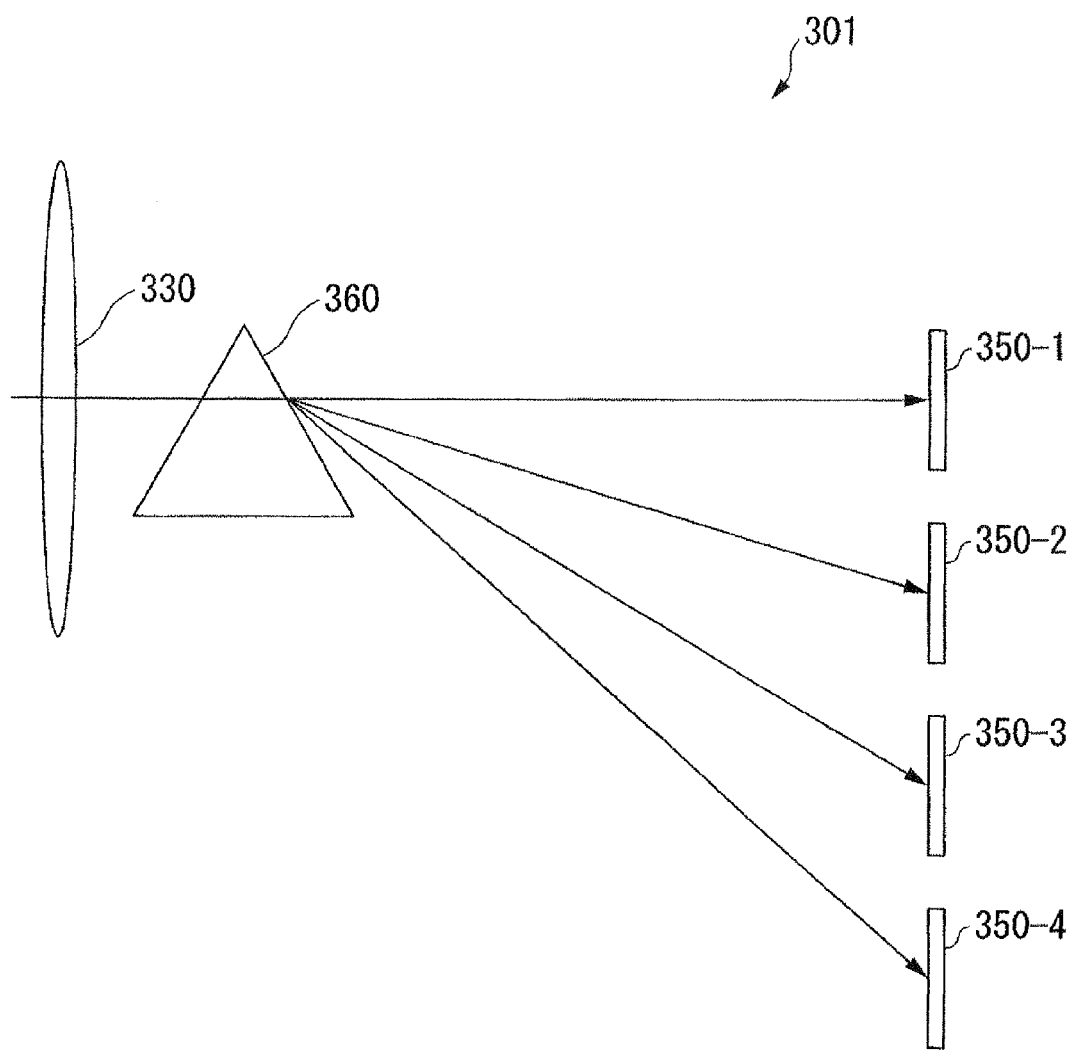
FIG. 24 is a diagram representing a concrete example of a light reception unit configured by using a prism according to an embodiment of the present invention.

Furthermore, the light reception unit 301b may be configured using a prism. FIG. 24 is a diagram representing a variation of the light reception unit 301b configured using a prism 360. In this case, only the first light reception unit for measurement 316 is placed on the light reception platform 350-1. Similarly, only the second light reception unit for measurement 317 is placed on the light reception platform 350-2, only the third light reception unit for measurement 318 is placed on the light reception platform 350-3, and only the light reception unit for identification is placed on the light reception platform 350-4. Light that passed through the lens 330 is split by the prism 360 into the first light for measurement, the second light for measurement, the third light for measurement, and the light for identification, and reaches the light reception platforms 350-1 to 350-4, which receive the respective light.

While a preferred embodiment of the present invention has been described above, it should be understood that these are exemplary of the invention and are not to be considered as limiting the present invention. Additions, omissions, substitutions, and other modifications can be made without departing from the spirit or scope of the present invention. The invention is not to be considered as being limited by the foregoing description, and is only limited by the scope of the appended claims.

What is claimed is:

1. A localization system comprising:
   n+1 number of luminescent devices, where n is an integer greater than or equal to one; and
   a sensor configured to move in each direction of n number of axes,
   wherein each luminescent device comprises:
   a luminescent unit configured to emit a light for measurement having an intensity that varies at a time cycle, the luminescent unit further configured to emit a light for identification including an information representing a position of the luminescent device, the luminescent unit emitting the light for measurement and the light for identification in synchrony with a phase of light emitted by another luminescent device; and
   wherein the sensor comprises:
   a light reception unit receiving the light for measurement and the light for identification by a plurality of light reception elements, each of the plurality of light reception elements comprising a plurality of light reception members, each of the plurality of light reception members comprising a charge accumulation unit which outputs an accumulated electric charge as an intensity of the light for measurement, and
   at least one processor wherein the at least one processor is configured to
   obtain a position of the luminescent device based on the light for identification received by the light reception unit,
   compute a phase of the light for measurement received by the light reception unit,
   select one luminescent device from the n+1 number of luminescent devices as a standard luminescent device based on the light for measurement emitted by each luminescent device and received by the light reception unit,
   compute a phase difference between the light for measurement emitted by the standard luminescent device and the light for measurement emitted by the another luminescent device, wherein the phase difference is computed for each luminescent device, and
   compute the position of the sensor based on the position and computed phase difference of each of the luminescent device,
   select, from among the plurality of light reception elements of the light reception unit, a light received by a group of selected light reception elements having a light reception intensity exceeding a threshold value, and group the plurality of light reception elements into a plurality of classes by distributing a first group of the selected light reception elements that are adjacent to each other to a first class and distributing a second group of the selected light reception elements that are not adjacent to each other to a second class, based on a spatial position of each of the light reception elements.

2. The localization system according to claim 1,
wherein the luminescent unit of the each luminescent device emits a plurality of light for measurement having an intensity that changes in each time cycle; and
wherein the at least one processor is configured to compute the position of the sensor using a particular light for measurement of a time cycle and to obtain an estimated distance between the sensor and the luminescent device, and then to compute the position of the sensor again according to the estimated distance and a phase of another light for measurement having a time cycle that is shorter compared to a time cycle of the particular light for measurement that was already used.

3. The localization system according to claim 2, wherein the at least one processor is configured to:
compute an estimated distance between the sensor and each luminescent device according to the position of the sensor already computed by the at least one processor,
compute a difference between the standard phase and the phase of the light for measurement having the shorter time cycle computed by the at least one processor, and
compute an added phase by adding the difference to the phase of the light for measurement having the shorter time cycle emitted by the luminescent device,
wherein the at least one processor is configured to compute a number of waves between the sensor and each corresponding luminescent device based on the estimated distance according to the light for measurement having the shorter time cycle compared to the particular light for measurement used to compute the position of the sensor,
wherein the at least one processor is configured to compute a phase of the light for measurement having the shorter time cycle emitted by the standard luminescent device,
wherein the at least one processor is configured to set the phase of the wave between the sensor and the standard luminescent device as a standard phase according to the estimated distance, and
wherein the at least one processor is configured to compute the position of the sensor based on the light for measurement having the shorter time cycle by processing the added phase previously computed as the phase of the light for measurement emitted by the luminescent device.

4. The localization system according to claim 2,
wherein a ratio of a first time cycle of a first light for measurement and a second time cycle of a second light for measurements comprises an integral ratio for reducing noise from another light for measurement of another time cycle.

5. The localization system according to claim 1, wherein the light reception unit comprises a lens, and the light reception element placed at a location different from a focal point of the lens.

6. The localization system according to claim 1, wherein the light reception unit comprises an optical low pass filter, the light reception element receiving a light passing through the optical low pass filter.

7. The localization system according to claim 5, wherein the lens is a fisheye lens.

8. The localization system according to claim 1, wherein the light reception unit receiving the light for measurement comprises four photoelectric conversion units, two drain gate units, four charge accumulation units, and four gate units.

* * * * *